United States Patent [19]
Candy

[11] Patent Number: 5,537,041
[45] Date of Patent: Jul. 16, 1996

[54] DISCRIMINATING TIME DOMAIN CONDUCTING METAL DETECTOR UTILIZING MULTI-PERIOD RECTANGULAR TRANSMITTED PULSES

[75] Inventor: Bruce H. Candy, Basket Range, Australia

[73] Assignee: BHC Consulting Pty Ltd, Glenside, Australia

[21] Appl. No.: 285,811

[22] Filed: Aug. 4, 1994

Related U.S. Application Data

[63] Continuation-in-part of Ser. No. 501,106, Mar. 29, 1990, abandoned.

[30] Foreign Application Priority Data

Mar. 29, 1989 [AU] Australia ................................. PJ3420

[51] Int. Cl.⁶ .............................. G01V 3/08; G01V 3/10; G01N 27/72; G01R 33/12
[52] U.S. Cl. .......................................... 324/329; 324/233
[58] Field of Search ..................... 324/326–329, 324/233, 239, 262

[56] References Cited

U.S. PATENT DOCUMENTS

| | | | |
|---|---|---|---|
| 4,110,679 | 8/1978 | Payne | 324/3 |
| 4,628,265 | 12/1986 | Johnson et al. | 324/329 |
| 4,868,504 | 9/1989 | Johnson | 324/329 |
| 4,942,360 | 7/1990 | Candy | 324/329 |

FOREIGN PATENT DOCUMENTS

| | | |
|---|---|---|
| 1315684 | 5/1973 | United Kingdom . |
| 2041532 | 9/1980 | United Kingdom . |
| 2071327 | 9/1981 | United Kingdom . |

*Primary Examiner*—Walter E. Snow
*Attorney, Agent, or Firm*—Cushman Darby & Cushman

[57] ABSTRACT

This invention is for a method of an apparatus to perform metal discriminatory detection comprising the application of a multi period rectangular wave form to a transmitter coil, processing received signals by combining received components measured during different selected periods with respect to the transmitted signal in a manner based upon the predictable characteristics of ground constituents and thereby to provide an output signal which will be selectively indicative of a metal object within a target volume and substantially distinguishable from any signal arising from any electrically non-conducting ferrite in the target volume.

22 Claims, 9 Drawing Sheets

DISCRIMINATING TIME DOMAIN CONDUCTING METAL DETECTOR UTILIZING MULTI-PERIOD RECTANGULAR TRANSMITTED PULSES

REFERENCE TO RELATED APPLICATION

This is a continuation-in-part of application Ser. No. 07/501,106, filed Mar. 29, 1990, which was abandoned in favor hereof.

BACKGROUND OF THE INVENTION

This invention relates to conducting metal discriminating detectors.

The problem to which this invention is directed relates to difficulties associated with discriminatory detection of target objects when within an environment which provides substantive magnetic signals where it has been hitherto difficult to distinguish a target signal from a background signal. Such an environment can be typically ironstone magnetic soils or salt water or both.

The object of this invention is to achieve a method and apparatus by which greater sensitivity can be achieved in such difficult environments with equipment that can be economically manufactured.

DESCRIPTION OF PRIOR ART

An alternating magnetic field metal detector consists of electronic circuitry in which an alternating current signal is produced in a transmitter coil, in order to transmit a magnetic field, and a loaded emf signal induced in a receiver coil is compared to the transmitter voltage signal. The transmitted magnetic field is sometimes referred to as the interrogating field.

The induced signal in the receiver coil results from the changing flux of magnetic fields linking the receiver coil. The magnetic fields have several sources, including the alternating currents flowing in the transmitter coil, magnetic fields emanating from sources within the influence of the transmitted magnetic field and quasi-static fields which exist independently of the transmitted magnetic field. The signal induced in the receiver coil is amplified, demodulated, filtered and further interpreted to test for the presence of metallic target objects in a volume of space which is influenced in a substantial way by the interrogating field. The volume of space so influenced shall be referred to as the target volume.

Consider for the sake of clarity an ideal situation in which the capacitance between windings of both the transmitter coil and receiver coil can be considered negligible. Also consider that the load presented to the receiver coil by the detection electronics is effectively infinite unless otherwise stated. Furthermore, consider that induced eddy currents in the transmitter and receiver coils can be considered for the following analysis to be negligible. Thus, for the analysis which follows, the received signal can be considered as the emf induced in the receiver coil by a changing magnetic flux, the magnitude of the induced emf being proportional to the rate of change of net magnetic flux linking the receiver coil.

Commercial metal detectors are usually classified into two main groups;

frequency domain (FD) detectors, sometimes called Fourier domain detectors; and pulse induction (PI) detectors, some of which can be further sub-classified as time domain (TD) detectors.

A FD detector transmits a magnetic field produced by applying a voltage signal which is a linear combination of one or more sinusoidally varying signals, the frequency of variation of each such signal being different from any of the other such signals. Each signal of a particular frequency shall be referred to as a basis signal, while the component of the field produced due to each of the basis signals shall be referred to as a basis field. The number of basis signals constituting the resultant transmitted signal is finite and is generally held to be fewer than ten. The principle of FD art is most easily explained describing a detector whose transmitted field comprises only one basis field, such a detector being an example of single frequency (SF) art.

In a SF detector, that component of a received signal which has a phase angle of 90 degrees relative to the current flowing in the transmitter coil is called the magnetic or reactive component; the component of a received signal which has the same or exactly opposite phase of the current in the transmitter coil is called the lossy or resistive component. Both of these components are synchronous with respect to the transmitted signal. Any component of the received signal which is not related to the phase of the transmitted signal is an asynchronous component of the received signal.

The interrogating field induces eddy currents in and magnetises various constituents of the target volume. Signals which are induced in the receiver coil by magnetic fields which are not produced by eddy currents induced in metallic target objects within the target volume shall be referred to as ground signals. Those constituents which produce the fields which induce the said ground signals shall be referred to as the ground. The phasor addition of the reactive and resistive components of the ground signal produces the ground vector.

In most ground there are two dominant sources of received synchronous ground signals;

ironstone, ferrites from which the reactive component of the signal is usually much greater than the resistive component, usually by more than 30 times; and mild electrical conductivity of the ground, often due to the combination of salts and moisture in the ground, producing a resistive component in the received signal.

In order to make the detector insensitive to the received synchronous ground signals, the phase angle of the synchronous demodulator is set to be the same as that of the ground vector. The reactive component of the ground signal usually has a much greater magnitude than that of the resistive component, so the phase of the resultant ground vector is usually within a few degrees of phase of the reactive component. The phase of the synchronous demodulator can be adjusted by the operator to negate small changes in the ground conditions, this process being called ground balancing.

The phase of the resultant ground vector can vary from one example of ground to the next due to changes in the conductivity in the ground, changes in the concentration of the ferrite in the target volume and changes in the relative magnitudes of reactive and resistive components in the signals from the different ferrite. Changes in any of these variables can produce significant shifts in the phase angle of the resultant ground vector of signals from proximate target volumes; the negation of these shifts requires adjustment of the ground balance.

Another instance of FD art shall be called multiple frequency (MF) detectors, in which an apparatus is adapted to transmit at least two basis signals. Such a device is described in U.S. Pat. No. 4,942,360 in which linear combinations of components of synchronous signals from the target volume produce a resultant signal which is substantially free of ground signals. Although MF detectors are an improvement on SF art, the requirements for highly stable and accurate electronic components in MF detectors increase the costs of their production.

PI detectors transmit pulsed magnetic rather than sinusoidal magnetic signals. Usually, the transmitter coil is activated with pulses of fixed voltages applied across it for finite periods of predetermined durations. Commercially available PI detectors have neither ground balancing facility nor the means to intrinsically cancel the ground signal. The applicant's formerly pending U.S. Pat. application Ser. No. 07/468,471 filed Jan. 12, 1990, and abandoned in favor of a continuation application Ser. No. 08/253,870, filed Jun. 3, 1994 describes a detector incorporating means of achieving both these effects, wherein the received signal is sampled at least twice during a complete cycle of transmission pulses and the respective samples are combined in such a way as to substantially negate the synchronous and asynchronous ground signals from the target volume. Any significant non-zero signal emerging from the process described is interpreted as being indicative of the presence of metallic target objects within the target volume. While such a device achieves good sensitivity to signals from metal target objects along with insensitivity to unwanted ground signals, PI detectors generally suffer the disadvantage of having greater power requirements than their FD counterparts.

SUMMARY OF THE INVENTION

The subject of this invention is a pulsed, discriminating, time domain conducting metal detection apparatus utilising rectangular transmitted pulses. The term time domain implies that the method employed by the invention is best analysed in terms of the temporal evolution of signals, just as frequency domain devices are best analysed in terms of the frequency and phase of signals.

Therefore in one form of the invention though this need not be the only or indeed the broadest form there is proposed a conducting metal discriminating detection apparatus for detecting a metal target in a target region comprising:

transmission means for transmitting a continuous pulsed voltage waveform to provide an alternating magnetic flux in the target region, the continuous pulsed voltage waveform comprising abrupt transitions from one substantially non-zero steady state voltage to at least one other substantially non-zero steady state voltage;

a detector coil for detecting a rate of change of magnetic flux in the target region, the rate of change of magnetic flux being a function of the alternating magnetic flux in the target region and the detector coil providing an induced voltage output signal in response to the rate of change of magnetic flux;

measurement means for measuring and providing at least three measurements of the induced voltage output signal each over a selected period of time at spaced apart times, the measurement means being adapted to measure the measurements after a duration of an initial time interval such that the initial time interval starts directly after one of the abrupt transitions and finishes when the rate of change of eddy currents, due to the effects of the alternating magnetic flux upon conductive soils within the target region, is substantially zero;

processing and averaging means for processing the three measurements to nullify from the measurements when averaged over the selected period of time influences due to two known functions, one function resulting from an instantaneous component due to the effects of the alternating magnetic flux upon magnetic soils within the target region and the other function from an historical component due to the effects of the alternating magnetic flux upon magnetic soils within the target region; and to give a final averaged voltage signal; and assessment means for providing an assessment of the final averaged voltage signal, the assessment being indicative of the metal target within the target region.

The assessment means can be adapted to provide a useful indication that there is conducting metal within the target region. For example, this invention can be used in a portable metal detector as used by valuable metal seeking enthusiasts who may be given an indication, for example, audio, visual, or other type of sensory input, that there is conducting metal present, and where the strength of that signal can be used as a further indicator of the total density of conducting metal. Alternatively, this type of metal detecting apparatus could be effectively used in a processing environment where, citing just one example, a conveyor belt is carrying ore and this apparatus and method is used to determine the metal content, if any, of that ore. If it is greater than some predetermined amount than the ore that is being assessed can be diverted to a different path, or can fall through a trap door. Other type of mechanism which separates the ore can also be employed. The purpose of this invention is to be able to detect with a much finer resolution conducting metals in a target volume, whether that be ore or even waste material. Conceivably this invention can be also used to determine and measure the quality of the conducting metal within a target region, information which may be used for scientific or commercial research. This invention could also be coupled to a signal recording device which may record the signal as data on a media which can then be analysed at a convenient time. By coupling this with an accurate positioning system the conducting metal content of particular target regions can be determined off-site and could thus conceivably be used on moving platforms.

In preference the measurement means and processing and averaging means comprises:

synchronous demodulator means for synchronously demodulating the induced voltage output signal at the spaced apart times; and low pass filter means for low pass filtering and averaging the synchronously demodulated induced voltage output signal at the spaced apart times.

In preference the transmission means provides the continuous pulsed voltage waveform such that the received signal is maintained substantially independent of a reactive to resistive response ratio component of the magnetic soils within the target region which is frequency independent at frequencies below 100 kHz.

In preference the continuous pulsed voltage waveform comprises two different pulse periods, these being a first pulse period and a second pulse period, the first pulse period being substantially of a shorter duration than the second pulse period, and the measurement means is adapted to synchronously demodulate the induced voltage output signal during a first measurement period occurring in the last quarter of the second pulse period to form a first signal, and the measurement means is further adapted to synchronously demodulate the induced voltage output signal during a second measurement period occurring in the first half of the first or second pulse period to form a second signal, wherein the second measurement period occurs after the rate of change of eddy currents in the conductive soils is substantially zero, and the processing means is adapted to form a ground balanced channel signal by scaling and subtracting the first signal from the second signal, the processing means being further adapted to compare the sign of the ground balanced channel signal with the sign of the first signal for the assessment means to provide a signal indicative of a ferrous target within the target region.

In preference the synchronous demodulation means comprises n synchronous demodulators and is operably configurable to satisfy the equation:

$$\sum_{i=1}^{n} S_i P_i = 0,$$

where $S_i$ is the relative effective gain of the $i^{th}$ synchronous demodulator the output of which is to be added and low-pass filtered, where the sign of $S_i$ is consistent with the polarity of the pulse being demodulated, and $P_i$ is the relative period for which the respective synchronous demodulator is on.

In preference the processing means is adapted such that the following equation is satisfied:

a. for an instantaneous component of the ground magnetic signal, $$\sum_{\alpha=1}^{l} G_k M n \alpha_k \beta_k = 0$$

and b. for a historical component of the ground magnetic signal $$\sum_{\beta=1}^{l} G_k C n \alpha_k \beta_k = 0$$

where $G_k$ is the gain of the demodulator passing the $k^{th}$ contribution, $Mn\alpha\beta$ is the demodulated and averaged instantaneous component, due to magnetic soils between the times $\alpha$ and $\beta$ following the $n^{th}$ transition from one substantially steady state voltage to at least one other substantially steady state voltage, and $Cn\alpha\beta$ is the demodulated and averaged historical component, due to magnetic soils, of the applied field between the times $\alpha$ and $\beta$ following the $n^{th}$ transition from one substantially steady state voltage to at least one other substantially steady state voltage.

In another form of the invention there is proposed a method of conducting metal discriminating detection of a metal target in a target region comprising the steps of:

transmitting a continuous pulsed voltage waveform to provide a magnetic field in the target region, the continuous pulsed voltage waveform comprising abrupt transitions from one substantially non-zero steady state voltage to at least one other substantially non-zero steady state voltage;

detecting the rate of change of magnetic flux of the magnetic field, the rate of change of magnetic flux being a function of the alternating magnetic flux in the target region and providing an induced voltage output signal in response to the rate of change of magnetic flux;

measuring at least three measurements of the detected induced voltage output signal each over a selected period of time at spaced apart times, the measurements occurring after a duration of an initial time interval, the initial time interval starting directly after one of the abrupt transitions and finishing when the rate of change of eddy currents, due to the effects of the alternating magnetic field upon conductive soils within the target region, is substantially zero;

processing and averaging the three measurements to nullify from the measurements when averaged over the selected period of time influences due to two known functions, one function resulting from an instantaneous component due to the effects of the alternating magnetic flux upon magnetic soils within the target region and the other function from a historical component due to the effects of the alternating magnetic flux upon magnetic soils within the target region; and to give a final averaged voltage signal; and effecting an assessment signal from the final voltage signal, the assessment signal being indicative of a metal target within the target region.

Preferably the detecting and measuring comprises the steps of:

synchronous demodulating the induced voltage output signal at the spaced apart times; and low pass filtering and averaging the synchronous demodulated induced voltage output signal at the spaced apart times.

In preference the target region has a reactive to resistive response ratio which is substantially independent of an interrogating frequency below 100 kHz.

In preference the continuous pulsed voltage waveform consists of a repetitive sequence of abrupt transitions from one substantially steady state non-zero voltage to at least one other substantially steady state voltage, and the one substantially steady state voltage being of a different time duration than that of at least one other of the substantially steady state voltages.

In preference the step of synchronously demodulating is accomplished by n coupled synchronous demodulators which satisfy the following equation:

$$\sum_{i=1}^{n} S_i P_i = 0,$$

where $S_i$ is the relative effective gain of the $i^{th}$ synchronous demodulator the output of which is to be added and low-pass filtered, where the sign of $S_i$ is consistent with the polarity of the pulse being demodulated, and $P_i$ is the relative period for which the respective synchronous demodulator is "on".

In preference the synchronously demodulating further satisfies the following equation:

a. for an instantaneous component of the ground magnetic signal, $$\sum_{\alpha=1}^{l} G_k M n \alpha_k \beta_k = 0$$

and b. for a historical component of the ground magnetic signal $$\sum_{\beta=1}^{l} G_k C n \alpha_k \beta_k = 0$$

where $G_k$ is the gain of the demodulator passing the $k^{th}$ contribution, $Mn\alpha\beta$ is the demodulated and averaged instantaneous component, due to magnetic soils between the times α and β following the $n^{th}$ transition from one substantially steady state voltage to at least one other substantially steady state voltage, and Cnαβ is the demodulated and averaged historical component, due to magnetic soils, of the applied field between the times α and β following the $n^{th}$ transition from one substantially steady state voltage to at least one other substantially steady state voltage.

In this invention, a transmission means is adapted to apply a voltage signal to a transmitter coil, the voltage signal taking the form of a sequence of transitions between different voltages, the durations of the transitions being some orders of magnitude less than the durations of the periods between them. In this invention, the transmitter voltage signal is held constant during the pulses. Each pulse is of a predetermined duration, but the durations of all pulses are not necessarily equal. There is, however, some sequence of a finite number of pulses which is repeated continuously during operation of the device. A minimal sequence required to completely account for the repeated transmission pulses shall be called a transmission cycle.

This invention also has a receiving means, part of which consists of a receiver coil which is positioned with respect to the transmitter coil such that there is substantially no signal induced in the receiver coil by the field of the transmitter coil when the apparatus described in this invention is operated in free space. A received signal, induced in a receiver coil by magnetic fields whose net flux linking the receiver coil changes with time, is initially amplified then sent to a number of synchronous demodulators. The signal emerging from each demodulator is filtered with a low pass filter, then amplified with a gain whose value has been predetermined, then the emergent signal is included in a linear combination of all the demodulated signals. This signal, which is the said linear combination of the demodulated signals, is then passed through a low pass filter, then further processed and sent to an indicator means.

This invention has several advantages over the prior art. Its advantages over available PI art are that the means of demodulation and processing of the received signal produce an output signal which is substantially free of ground signals while still being sensitive to the presence of metallic target objects within the target volume. They also allow discrimination between ferrous and non-ferrous metallic target objects. This invention also has a method of significantly reducing the operating power requirements of PI art.

With this invention the frequent adjustment of ground balance, required with SF art in order to adjust to changing ground conditions, is not necessary. While MF art substantially reduces the need to adjust the ground balance, it also requires expensive electronics. This invention has the advantage that it can be embodied in such a way as to avoid the necessity of such expense.

To enable a more detailed understanding of this invention, further definitions and background physics will be presented.

The term "first order object" refers to a target object which can be represented as a single inductor L, to which the interrogating field is loosely coupled, loaded with a single resistor R. For such an object, the characteristic frequency ω is defined as R/L. Many metallic target objects can be approximately represented as first order objects whose characteristic frequencies depend upon the type of metal and its shape in each instance. The mildly conducting aspect of soils can be represented by a continuum of first order objects. In an example of a mildly conductive soil and a transmitter coil whose diameter is in the order of 1 m, the distribution of characteristic frequencies is significant only at frequencies much higher than the pulse rates of the transmitted signal and peaks at frequencies in the order of 1 MHz. The characteristic frequencies for metallic target objects are generally much less than 1 MHz.

The greater part of the synchronous ground magnetic field emanating from the target volume can be attributed to the reaction of ferrite material to the interrogating field and can be thought of as comprising two components;

a first component which at any instant depends directly upon the nature of the interrogating magnetic field at that instant, this being called the instantaneous component; and a second component which at any instant depends upon the nature of the interrogating magnetic field during all time prior to that instant, this being called the historical component.

While it is strictly true that the instantaneous component does lag any changes in an applied magnetic field, the lag is negligible in the context of this invention and the instantaneous component shall be discussed as if it were actually instantaneous. On the other hand, unless explicitly stated otherwise, it is assumed in this discussion that the duration of a transmission cycle of the detector is short enough that the detector can be considered to be stationary with respect to the target volume for the duration of each transmission cycle. Further to the first of these assumptions, it is assumed throughout this discussion that the intensity of the applied field is not great enough to produce saturation in the magnetisation of ferrite within the target volume. Thus, the intensity of the instantaneous component of the ground magnetic field from a particular target volume is proportional to the intensity of the applied field at any instant.

Given that the form of the applied magnetic field is predictable, the instantaneous component of the magnetisation of the ferrite and the signal it induces in the receiver coil are predictable apart from their magnitudes. Therefore it is possible to substantially null that component of a received signal in any one transmission cycle which is due to the instantaneous magnetisation of the ground; the component due to the instantaneous magnetisation of the ground shall be called the instantaneous ground signal. This null can be achieved by forming a non-trivial linear combination of at least two averaged portions of the received signal, synchronised with respect to the transmitted field, such that the said linear combination is always zero for the instantaneous ground signal.

As implied previously, that component of a received signal which is the historical component of the ground signal does not depend upon the applied field at that instant, but the history of the field as it was applied; the historical component of the ground signal shall be called the historical ground signal.

Knowledge of the history of the applied field allows the prediction of the form of the historical signal component, again leading to a method for cancelling the historical component. This null can be achieved by forming a non-trivial linear combination os at least two averaged portions of the received signal, synchronised with respect to t he transmitted field, such that the said linear combination is always zero for the historical ground signal.

We have observed that while the ratio of historical to instantaneous ground signals will generally vary between one example of ground and another, the ratio in any single sample of ground is constant to within a fraction of a percentum with applied sinusoidal magnetic fields with frequencies up to 100 kHz; that is, the ratio is independent of frequency up to 100 kHz. This allows the possibility of cancelling both the historical and instantaneous ground signals when the received signal contains both. They can be cancelled by forming a non-trivial linear combination of at least three averaged portions of the received signal. These ideas can be clarified with mathematical expressions, discussed below.

Consider a single frequency component of a received signal. A portion of this received signal which has been averaged over time can be expressed as $$P_i(f) = A \int_{t_i} [\Gamma(f)V_{inst}(t) + V_{hist}(t)]dt \tag{1}$$

where f is the single frequency component, A is a constant, applicable to all samples from the same transmission cycle, $\Gamma(f)$ is the ratio of historical to instantaneous components, $t_i$ shows that the integration is over the ith. sample period and V(t) is the received signal. $P_i(f)$ is the average of the signal as sampled over the entire interval $t_i$, or the ith. sampling period. A linear combination of at least three such separate samples at any particular frequency can be formed such that were V(t) composed entirely of the signal induced by the ground magnetic field, $$\sum_{i=1}^{N \geq 3} G_i(f)P_i(f) = 0 \tag{2}$$

The $G_i$ are the coefficients of the linear combination and are expressed as functions of the frequency as they must change to produce the required null as the $P_i$ change with frequency. In order to produce a general cancellation, it would be necessary to produce such a linear combination for every component frequency which has significant amplitude, were it not for the fact that the ratio $\Gamma$ is independent of frequency up to 100 kHz, a range which encompasses all of the frequency components of the transmitted pulse train which have significant amplitudes. Therefore, the $G_i$ of equation (2) are also independent of frequency within the same range and a null of both the instantaneous and historical ground signals can be produced using a non-trivial linear combination of only three of the $P_i$ during any one transmission cycle.

The ratio of instantaneous and historical ground signals being independent of frequency allows the general design and production of the TD detector; were it not for this independence, careful consideration would have to be given to the exact frequencies involved in production of the signals transmitted and received by the detector. In practice, the number of frequency components to which the receiving and demodulating means of a detector could be allowed to respond would have to be kept finite as in the device described by Johnson in U.S. Pat. No. 4,868,504 where the received signal is low pass filtered to admit only signals corresponding substantially to the fundamental and third harmonic frequencies of the transmitted signal before demodulation is performed. Although Johnson's device is an example of rectangularly pulsed art, it is not an example of TD art, analysis of its demodulation and processing of received signals owing more to the tenets of FD art.

As well as negating important components of the synchronous ground signal, samples of the received signal can be combined in such a way as to remove the effects of certain asynchronous signals, namely signals induced by movement of the detecting coil through paleomagnetic fields of rocks in the target volume, the geomagnetic field of Earth and signals due to drift of the signal in the electronic circuitry known as "1/f" noise. Asynchronous signals with significant amplitudes are usually slowly varying when compared to the variations in the received signal as the receiver coil passes over a metallic target object, so usual practice in metal detectors has been to place a high pass filter between the receiver coil and the synchronous demodulators; this is in the form of alternating current (AC) coupling between the two. Such alternating AC coupling has the disadvantage that the signal entering the synchronous demodulators at any instant depends to some extent upon the history of the received signal.

This invention obviates the need for AC coupling between the first amplifier and the synchronous demodulators by taking another sample of the received signal and including it in the linear combination for producing a null sum signal with respect to asynchronous signals. As stated previously, one source of the asynchronous signal is the changing flux linking the detecting coil of the paleomagnetic field of rocks and soil within the target volume. The magnitude of the received signal induced in the receiving coil depends upon the rate of change of the flux linked by the coil; the rate of change of the received signal depends upon the second time derivative of the flux linking the coil. Therefore, it is assumed that the rate of change of that part of the received signal induced by the paleomagnetic field of the target volume is very small, i.e. that part of the signal can be assumed to be constant during each transmission cycle. A similar argument applies to the signal induced by variations in the flux of the Earth's geomagnetic field linking the receiver coil.

Likewise, the rate of change of that component of the signal due to 1/f noise is slow enough for components of significant magnitude that this component can also be considered to be constant for the duration of each transmission cycle. As all three components are constant over one transmission cycle, a linear combination of at least two signal samples as in equation (1) can be combined so as to produced a net null asynchronous signal. This combination can be represented by $$\sum_{i=1}^{N \geq 2} S_i P_i = 0 \tag{3}$$

where $P_i$ is the ith portion of the signal and $S_i$ is the ith. signal multiplier whose value is either +1 or −1.

A component of the received signal will be due to currents induced in conductive constituents of the target volume which are not metallic. A large portion of target volume will generally be mildly conductive due to the presence of salts and moisture in the ground. As stated previously, the mildly conductive constituents of the ground can be likened to a continuum of first order objects whose characteristic frequencies peak at around the order of 1 MHz. Changes in magnetic flux through the first order objects induce eddy currents in them, these eddy currents themselves producing magnetic fields whose senses are such that the produced fields oppose the change in the interrogating magnetic field.

When a voltage signal applied to the transmitter coil transits, the rate of change of the interrogating field intensity suddenly changes sign. This sudden change induces rapid changes eddy currents in conductive constituents of the target volume, the change in the eddy currents taking place over a period in the order of 1 µs. Between the transmitter voltage transitions, the induced eddy currents are nearly constant; thus the signals received signals induced by the eddy currents present between transmitter voltage transitions are nearly zero. Indeed, the received voltage signal is almost identical in form to the received instantaneous ground signal voltage component, except for magnitude and at periods immediately after transmitter signal voltage transitions.

As the rates of change of eddy currents induced in the ground are of greatest magnitude during and immediately after transitions in the voltage signal applied to the transmitter coil, they can be substantially cancelled by excluded the received signal from further processing during each transition and until the received signals due to ground eddy currents have substantially decayed to zero. Most metallic target objects are highly conductive and usually have characteristic frequencies which are much lower than that of saline solution. As such, the signals induced in the receiver coil by the decay of eddy currents in metallic target objects persist for a much longer period than those induced by the decay of ground eddy currents. Thus, the exclusion of those portions of the received signal due to the decay of ground eddy currents does not exclude all of the components of the signal due to metallic target objects, except in cases of extremely small and/or diffuse metallic target objects.

The final part of the discussion of the general theory of this invention is a further description of signal due to the ferrite constituents of the target volume, responsible for a large part of the ground signal. Firstly, the instantaneous part of the ferrite signal will be discussed. Take the time constant of the transmitter coil circuit to be $\Omega$ seconds. Take the transmitting voltage signal to consist of transitions between two direct current (DC) voltages, V1 and V2 of opposite polarity, with the time taken for each transition being much shorter than the time taken between transitions. Take the time at the last transmitter signal voltage transition to be t=0. As well, take the period between the last and second last transitions to be $\tau_1$, the period between the last and third last transitions to be $\tau_2$, the period between the last and fourth last transitions to be $\tau_3$, and so on. Under such conditions and with the device proximate to a sample of typical ground containing some distribution of ferrites as well as being mildly conductive as discussed previously, the ideal receiving coil will have a voltage signal induced in it even though it is nulled to the direct field of the transmitter coil in free space. For this part of the discussion only that part of the signal which is due to the instantaneous reaction of ferrite to the interrogating field is examined. If the instantaneous component is sampled between the nth. and the (n+1)th. transmission voltage transmission, the time average of that sample is proportional to $$M_{n\alpha\beta} \propto \int_{t=\alpha}^{\beta} \exp(-\Omega t) \left[ 1 + \sum_{j=1}^{n} \{(-1)^j(1 - \exp(-\Omega\tau_j))\exp(-\Omega\tau_j)\} \right] dt \quad (4)$$

where $t=\alpha$ and $t=\beta$ occur during the current period between transmitter voltage transitions.

That this average (4) is predictable, except for absolute magnitude, given knowledge of the transmitted signal and the decay time constant of the transmitter coil allows the cancellation of this component of the received signal in line with the method of linear combinations of signal samples as described previously, that is using a linear combination of at least two samples as in (4) such that $$N \geq 2 \quad (5)$$
$$\sum_{i=1}^{} G_i M_{n\alpha_i\beta_i} = 0$$

The generalised, purely historical ground signal can also been determined. To understand the nature of the historical ground signal, one must consider a bulk sample of ferrite as being represented as a collection of tiny magnetic particles, each with its individual magnetic dipole. The physical structure of a magnetic particle determines the direction of alignment of its magnetic dipole when not immersed in an externally generated magnetic field. For this explanation a bulk sample of ferrite whose structures determine that its magnetic dipoles are initially oriented randomly will be considered. Under the influence of an applied magnetic field, the individual magnetic dipoles tend to align themselves with the applied magnetic field, but unless the physical structure of a magnetic particle changes during application of the field, the dipoles will generally revert to their original orientations when the field is removed. The structural properties of each of the magnetic particles within the ferrite change at an average rate which is determined by the type and temperature of the ferrite. While a field is applied, any structural changes which occur to a particle tend to be such that the orientation of its magnetic moment will now have a component in the direction of the field applied during the changes, even when the field is no longer applied. The strength of the tendency to alignment is a function of the intensity of the applied field. When the field is applied for some time, a number of particles undergo the structural changes producing a net remanent magnetisation of the bulk ferrite which remains when the external field is no longer applied.

When the applied field is removed structural changes continue to occur to the magnetic particles at the same rate as before, but the tendency for alignment is now much reduced as the aligning field is now due only to the remanent field of the ferrite. As more of the particles which changed structurally during application of the field change again while no external field is applied, the now reduced tendency to alignment of their magnetic moments generally allows a reduction of the component of their magnetic moments in the direction of the remanent field, further reducing the intensity of the remanent field. It is this decay of the remanent magnetisation of the ferrite which induces the historical component of the ferrite ground signal in the receiver coil.

Without the aligning influence of the remanent field, the decay of the remanent magnetisation would be exponential. The magnitude of the remanent field at the moment the external magnetic field is no longer applied depends, in part, upon the type of ferrite, in particular the rate at which the structural changes occur to the magnetic particles at any given temperature. The magnitude of the remanent field at any moment also depends upon the duration of the applied magnetic field. The rate of decay of the remanent magnetisation depends upon the duration of the applied field in this way; the longer the duration of the applied field, the longer it takes the remanent magnetisation to decay to any particular fraction of its initial intensity with no applied field. While a more quantitative analysis of this effect is more complicated in this invention, the principles and the basic implications for the decay of the remanent field are the same.

For simplicity, assume that the Q of the transmitter coil is effectively infinite. The historical component of the received signal, when demodulated and averaged between $t=\alpha$ and $t=\beta$ gives a signal $$D_{n\alpha\beta} \propto \int_{t=\alpha}^{t=\beta} \left( \frac{1}{t} + \sum_{j=1}^{n} (-1)^j \frac{1}{t+\tau_j} \right) dt \quad (6)$$

where $\tau_i$ is defined above and t=0 at the last transmitter coil voltage transition. Note that with a finite transmitter coil Q, this equation is somewhat different and more complex.

However equation (6) illustrates the approximate form of the historical component, albeit idealised.

Again, this component of the received signal can be cancelled for any transmission cycle by forming a linear combination of at least two samples such that $$N \geq 2$$
$$\sum_{i=1}^{} G_i C_{n\alpha_i\beta_i} = 0 \qquad (7)$$

where $C_{n\alpha\beta}$ is the actual form of the average signal when the transmitter coil has a finite Q. If both equations (5) and (7) are satisfied, the final averaged contributions serve to cancel the entire component of the received signal which is due to ferrite.

There are several different concepts of TD detection described below. In each case it is assumed that the TD is adapted to be substantially nulled to asynchronous components of signals, that is equation (3) is satisfied.

BRIEF DESCRIPTION OF THE DRAWINGS

To assist with the understanding of the present invention, reference is made to the accompanying illustrations, where

FIGS. 5A–8F show voltage waveforms at various stages in FIG. 1 for a third preferred embodiment.

BEST MODE OF THE INVENTION

Referring now to the figures in detail we present herewith three preferred embodiments.

THE FIRST PREFERRED EMBODIMENT

This description of the first preferred embodiment refers to FIG. 1 and FIGS. 2A–2F in detail.

Figure 1:
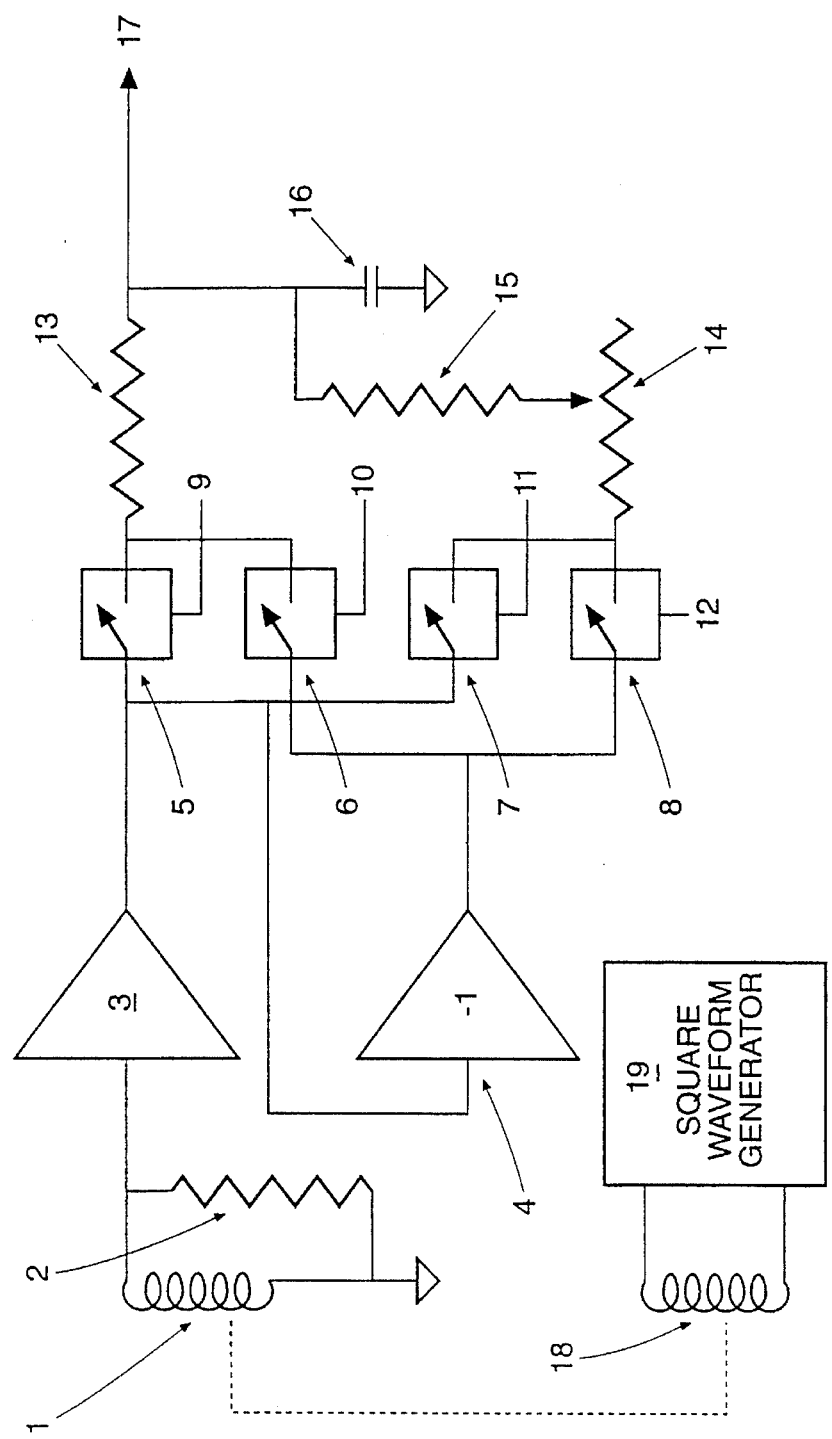
FIG. 1 shows a basic electronic block diagram of a means to effect a variable ground balance control according to a preferred embodiment.
Figure 2:
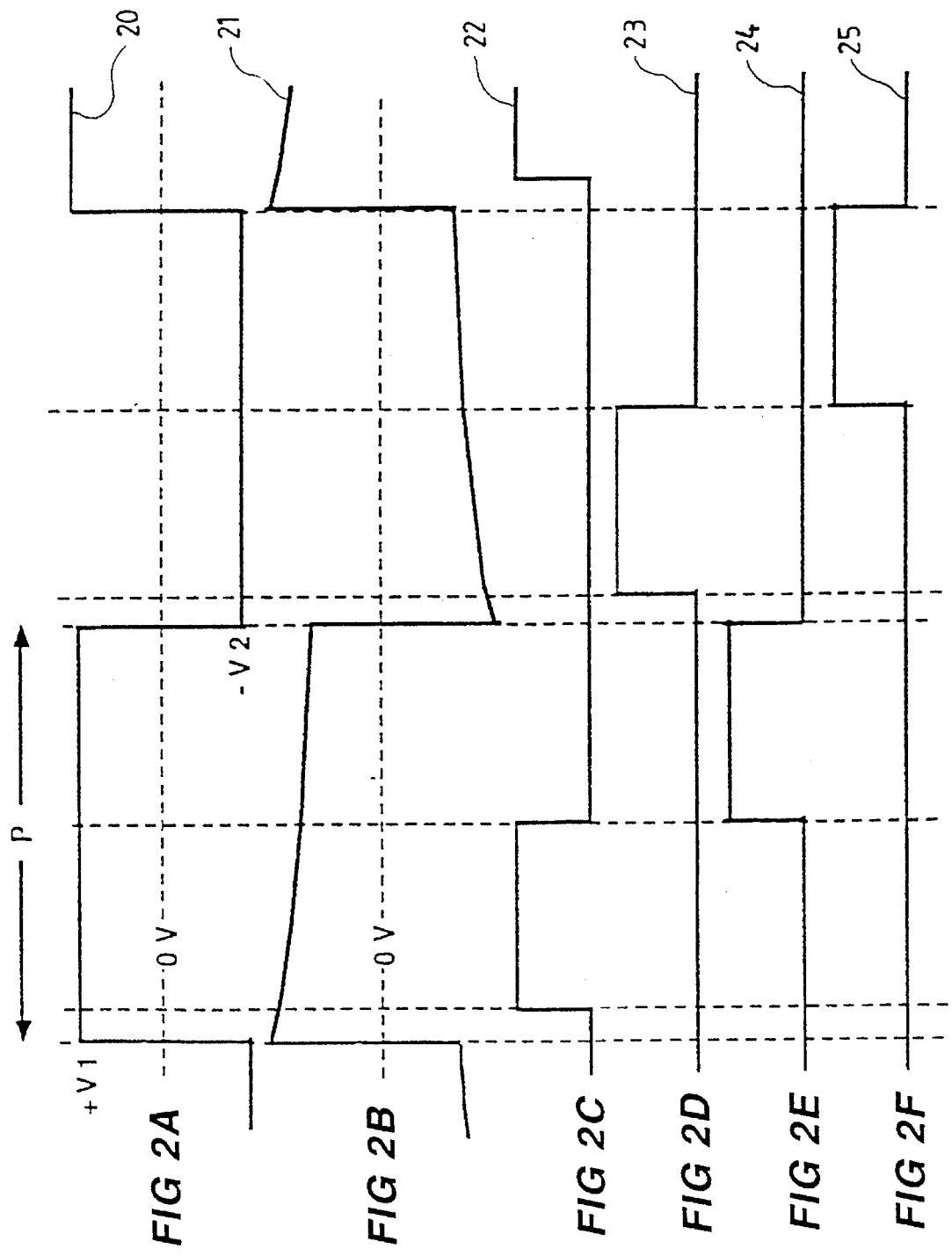
FIGS. 2A–2F show voltage waveforms at various stages in FIG. 1 for the first preferred embodiment.

A device for implementing a concept of a TD detector is shown in the schematic diagram FIG. 1. Voltage waveforms at various points in FIG. 1 are shown in FIGS. 2A–2F. In FIG. 1 a receiver coil (1) is connected to a preamplifier (3) and loaded with a damping resistor (2). The output of the preamplifier (3) is connected to the input of an inverting amplifier (4) with a gain of −1 and to the inputs of synchronous demodulators (SD) (5) and (8). The output of the inverting amplifier (4) is connected to the inputs of the SD's (6) and (7). The SD's (5), (6), (7) and (8) are all analogue switches whose states, ie open or closed, are controlled by voltages applied to their respective gates (9), (10), (11) and (12). When a high voltage is applied to the gate of a SD, the switch which constitutes that SD closes, or turns "on", and the voltage at the output of the SD has a low output impedance and its voltage is the same as the voltage applied at the input of the SD; a low voltage applied to the gate of a SD opens the switch which constitutes the SD, also called turning the SD "off", producing a very high output impedance at the output of the SD.

Note that in this schematic diagram there is no indication of any capacitive coupling between the preamplifier (3) and the SD's (5), (6), (7) and (8), nor is there any included in any of the physical embodiments described.

The transmitter coil (18) has a square voltage waveform (20) applied to it by the generator (19). The waveforms (21), (22), (23), (24) and (25) are generated so as to be synchronous with the waveform (20), as implied by FIGS. 2A–2F. A received signal at the output of the preamplifier (3) is depicted by the voltage waveform (21). The voltage waveform (22) is applied to the gate (9) of SD (5);

waveform (23) is applied to the gate (10) of SD (6);

waveform (24) is applied to the gate (12) of SD (8);

waveform (25) is applied to the gate (11) of SD (7).

The outputs of SD's (5) and (6) are connected to each other and, through the resistor (13), to the capacitor (16);

the outputs of SD's (7) and (8) are connected to each other and, through the variable resistor (14) and the resistor (15), to the same terminal of capacitor (16) to which the outputs of (5) and (6) are indirectly connected.

This junction of (16) with the outputs of the SD's is designated (17) and its output may be adapted for further processing. The capacitor (16) is grounded; in conjunction with the resistors (13), (14) and (15) it forms a low pass filter and adder. The wiper of the resistor (14) can be adjusted by the operator, its adjustment altering the proportions of the two signals added at (17).

Some further details need to be noted about the waveforms in FIGS. 2A–2F. The periods of V1 and V2 in waveform (20) are of equal duration. The periods of high voltage in waveforms (22) and (23) are of equal duration. The periods of high voltage in waveforms (24) and (25) are of equal duration. The waveforms of FIGS. 2A–2F show that the SD's (5) and (6) are turned on some short time after cessation of each voltage transition in the waveform (20). The SD's (7) and (8) are turned on after the SD's (6) and (5) are, respectively, turned off then are turned off before the start of the next voltage transition in the waveform (20).

Note also that the received voltage waveform (21) shows some exponential decay between each pair of transmitter voltage transitions (21). The wire loop which constitutes the transmitter coil naturally has some resistance. In this application the transmitter coil can be adequately modelled as a pure inductance, $L_{Tx}$, in series with the resistance, $R_{Tx}$, of its windings. The time constant of the transmitter coil is $R_{Tx}/L_{Tx}$, this being reflected in the time constant of the decay of the received voltage waveform (21).

The durations of the SD's (5) and (6) being on are equal, as per their respective gate control waveforms (22) and (23), and the signal emerging from the preamplifier (3) is inverted before being sent to the SD (6). Similarly, the durations of the SD's (7) and (8) being on are equal, as per their respective gate control waveforms (24) and (25), and the signal emerging from the preamplifier (3) is inverted before being sent to the SD (8). The summation and averaging of the signals from SD's (5) and (6) over a transmission cycle substantially cancels asynchronous signals as per the equation (3). Summation and averaging of the signals from SD's (7) and (8) also substantially cancel asynchronous signals as per the equation (3). Because of this cancellation, it is possible to continue the discussion of this embodiment as though the asynchronous components of the received signal are not present in any part of the circuit; this shall be done in order to simplify the discussion.

No sample of the received signal is taken during or at any time immediately after a transmitter voltage transition. During the transitions, eddy currents change rapidly in conductive elements of the ground during times in the order of 1 μs. Taking signal samples only after the ground eddy currents have substantially settled excludes the effects of the ground eddy currents from any processing by this device.

During each pulse in the transmitter voltage waveform (20), the magnitude of the instantaneous ground signal remains constant or falls slightly as depicted by the waveform (21). The accompanying historical ground signal undergoes a much greater decrease in magnitude, so that the proportion of historical to instantaneous ground signal is much greater in the first half of a transmitter voltage pulse than during the second half of the transmitter pulse. The SD (6) provides a synchronous signal of the same sense as the SD(5) for while the input of SD (6) is connected to the output of the inverter (4), the sense of the signal supplied to the input of the inverter (4) while the SD (6) is on is inverted with respect to signals supplied to the input of SD (5) when the SD (5) is on. This is because the rates of change of the interrogating field are of opposing senses during the two sampling periods. Therefore the synchronous signals from the SD's (5) and (6) are of the same sense and they add rather than subtract. A similar argument for the SD's (7) and (8) shows that the signals from the SD (7) and (8) pair are also of the same sense with respect to each other, but it must also be noted that they are of opposite sense with respect to the signals from the SD's (5) and (6).

Although there are four separate signal sampling periods in this embodiment, there is a symmetry in the transmitted pulses as well as the timing of the SD's such that there are only two independent sampling periods; except for sign, the samples taken while SD's (5) and (6) are on are identical and the samples taken while SD's (7) and (8) are on are identical. Therefore, it is not possible to generally null synchronous ground signals due to ferrite with this embodiment, but by adjusting the variable resistor (14) and thereby adjusting the proportion of the instantaneous to historical component combined at the capacitor (16), it is possible to cancel both the instantaneous and historical ground signals for each particular sample of ground with its particular ratio of historical to instantaneous signal components. As the detector moves over different examples of ground, the variable resistor (14) will often need to be adjusted by the operator to compensate for the changing ground conditions.

In this embodiment, greater sensitivity to first order objects can be achieved by shortening the durations of the sampling periods, such that during one transmitted pulse the first sampling period commences after a short time after the voltage transition in the transmitter waveform to reduce the signal component due to conductive ground constituents, then ends after it has endured for a time of P/4 (c.f. FIGS. 2A–2F). The second sampling period ends at the last transition of the transmitter pulse and commences P/4 before that. In this manner, the first sampling period contains that part of the signal which has the greatest amplitude due to first order objects while the second sampling period has the least signal due to first order objects. Making the sampling periods even shorter and a greater time apart would make the device even more sensitive to the signals from first order objects, but electronic noise will begin to become significant if not enough signal is included.

THE SECOND PREFERRED EMBODIMENT

This description of a second preferred embodiment refers to FIG. 3 and FIGS. 4A–4H in detail.

Figure 3:
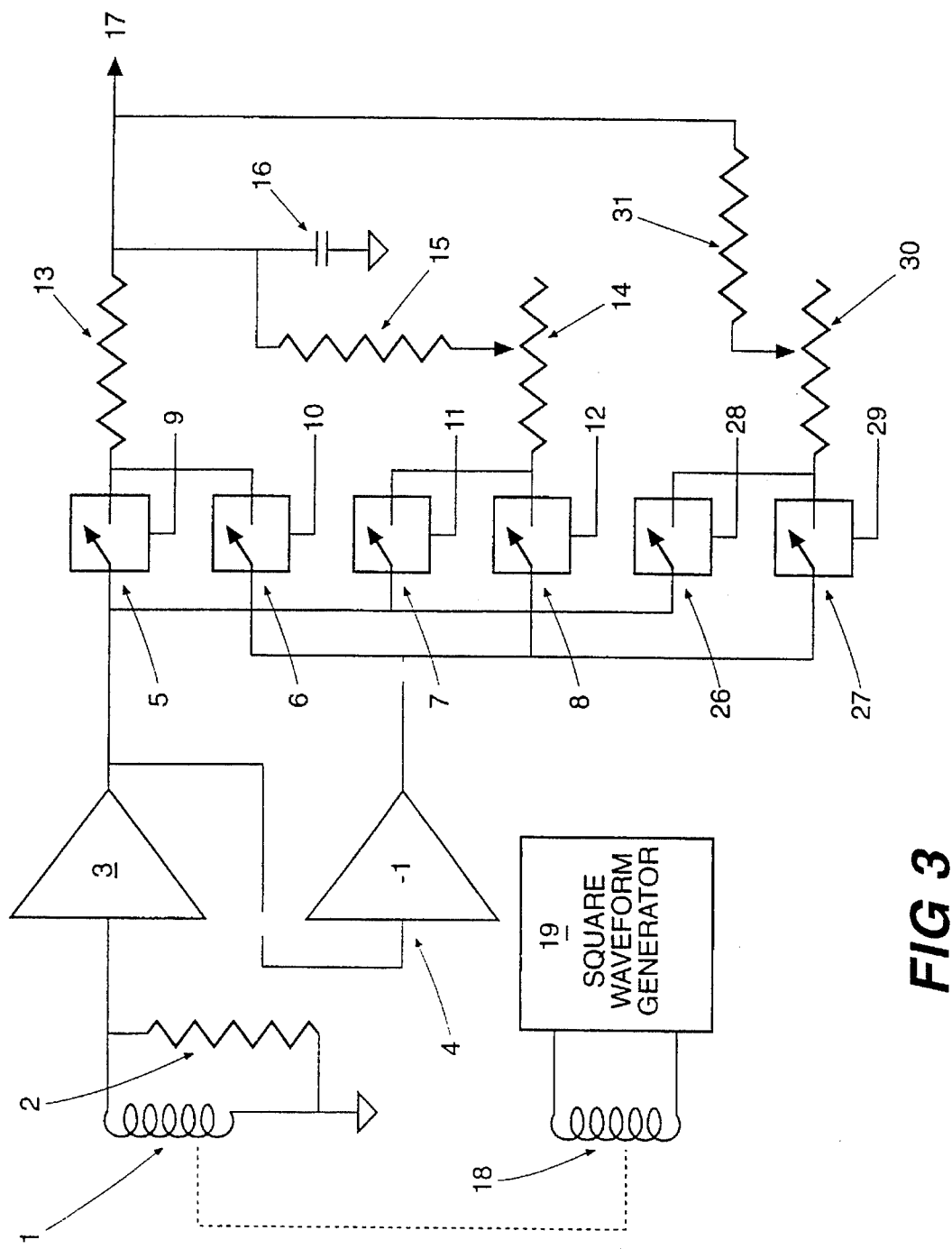
FIG. 3 shows a basic electronic block diagram of a means to effect intrinsic ground balance control according to a second preferred embodiment.
Figure 4:
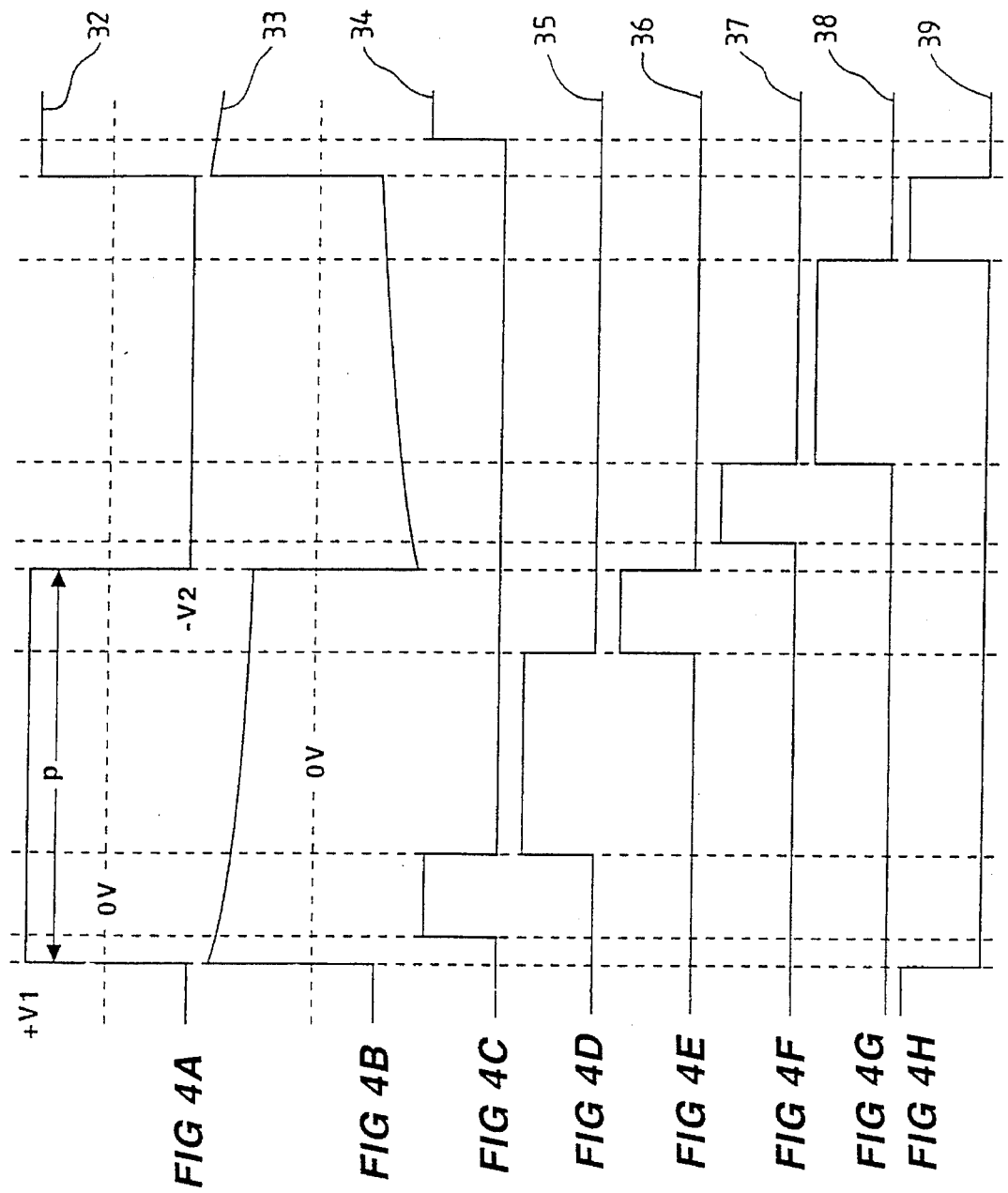
FIGS. 4A–4H show voltage waveforms at various stages in FIG. 3 for the second preferred embodiment.
Figure 5:
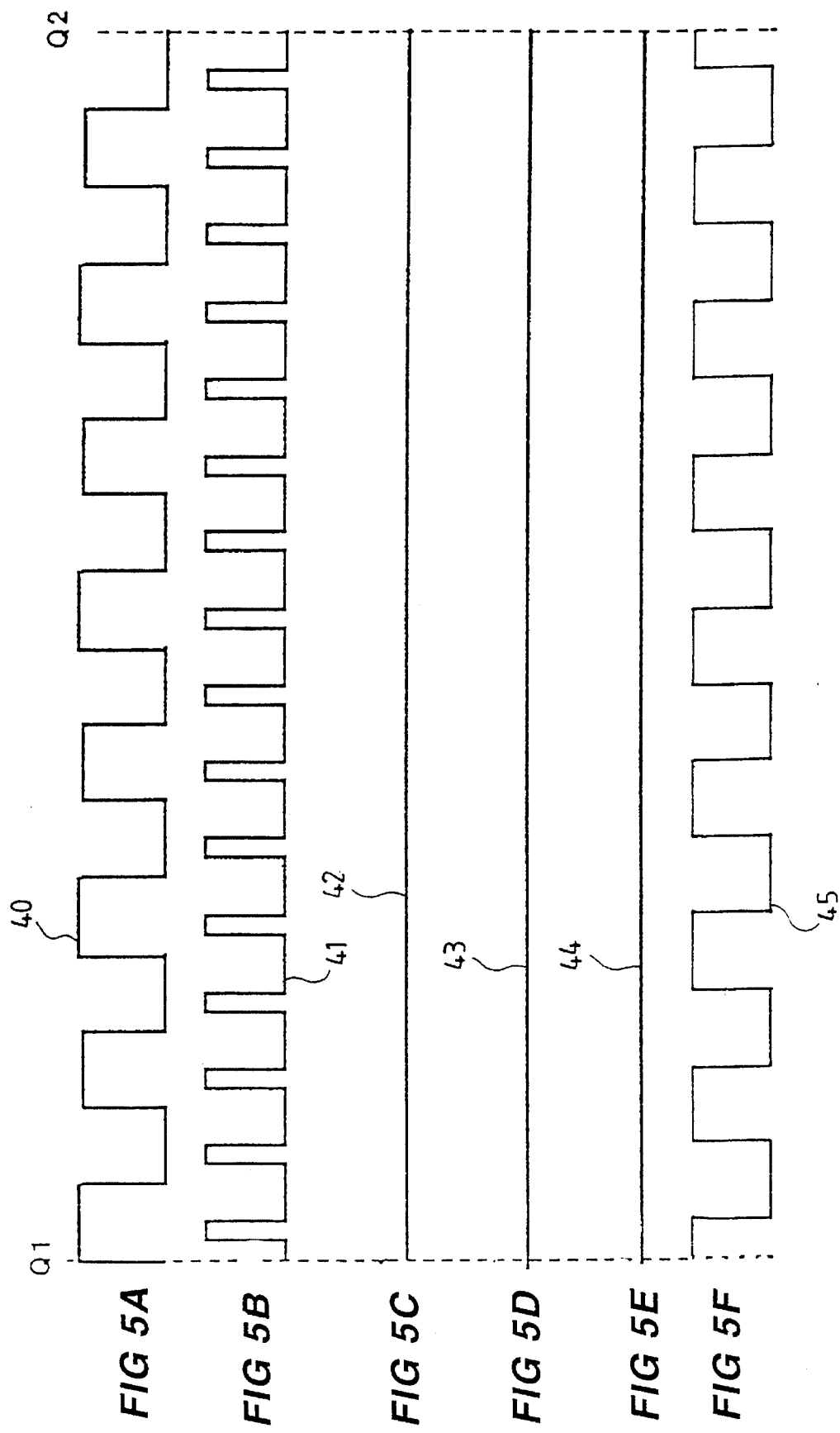
Figure 6:
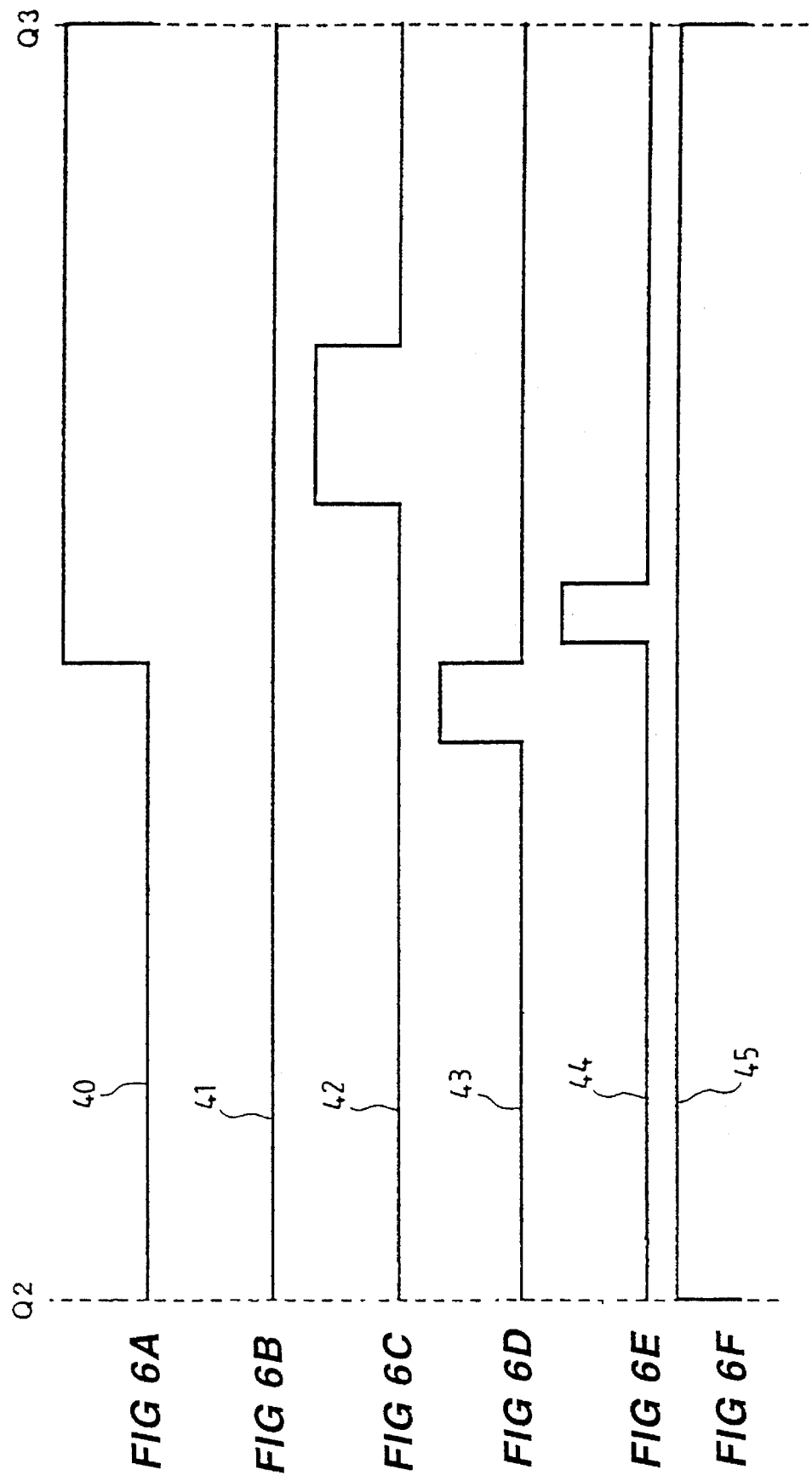
Figure 7:
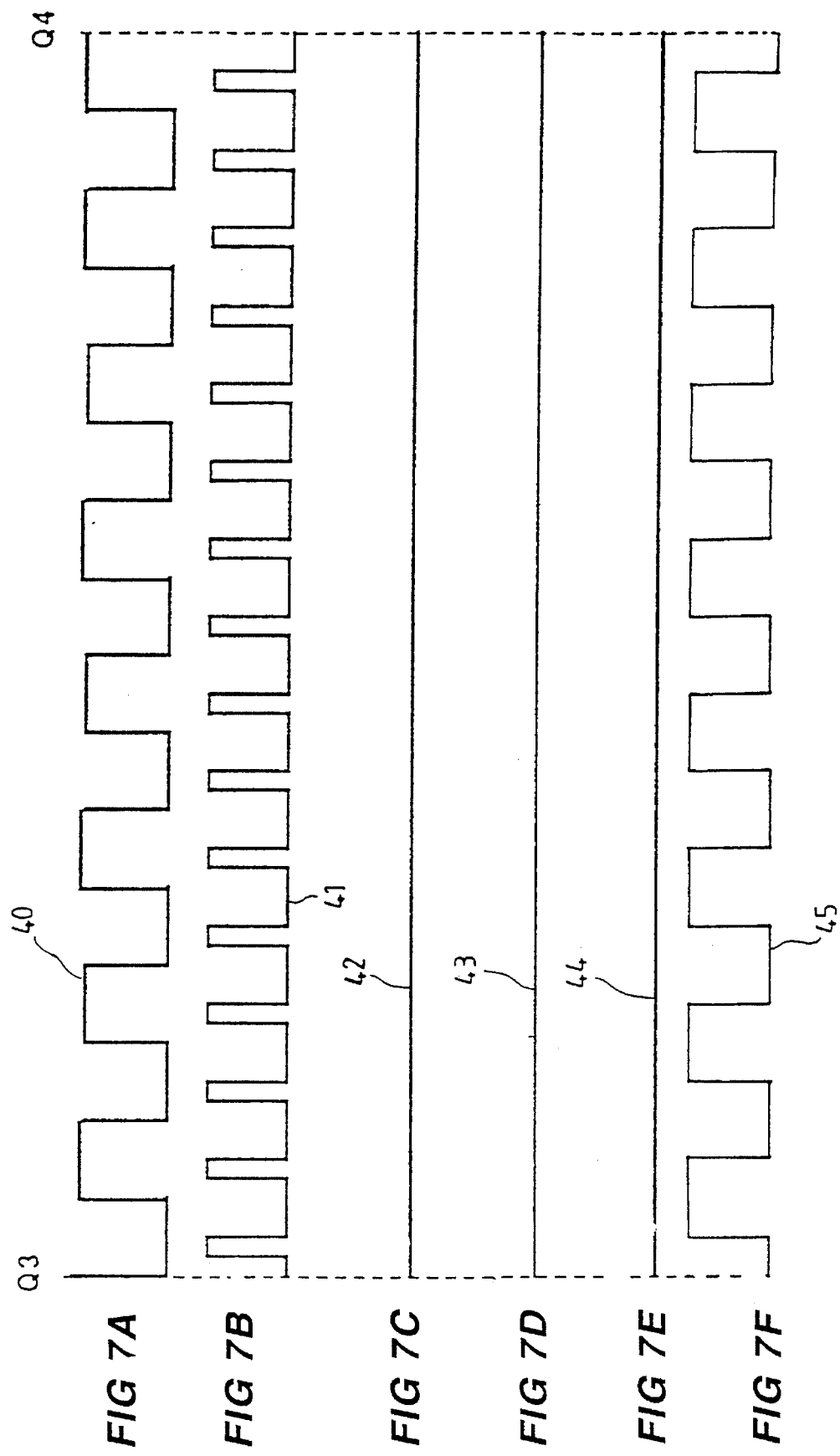
Figure 8:
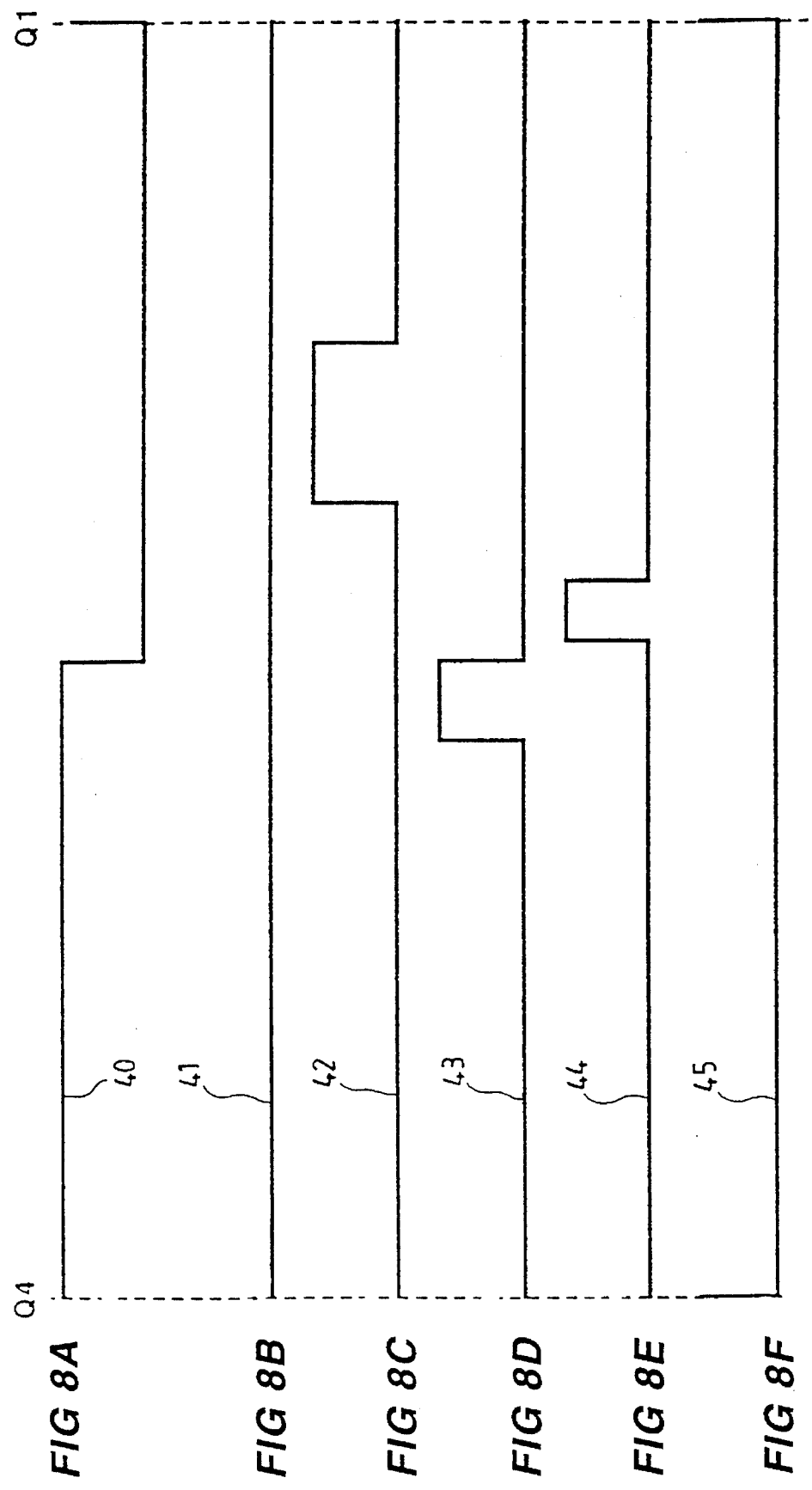

This embodiment has a novel TD detector concept where there is cancellation of the conductive ground signal as well as the instantaneous and historical components of ferrite signals. Cancellation of asynchronous signals is included. FIG. 3 describes such an embodiment where the components perform the same tasks as in the first embodiment and FIG. 1 except for the addition of two SD's and two resistors; the same labels are used for the circuit components common to FIG. 1 and FIG. 3. The associated voltage waveforms are shown in FIGS. 4A–4H.

The output of the preamplifier (3) is also connected to the input of SD (26) and the output of the inverting amplifier (4) is connected to the input of SD (27). The state of the SD (26) is controlled with a signal at the gate (28) and the state of the SD (27) is controlled with a signal at the gate (29). The outputs of the SD's (26) and (27) are connected together and, through a variable resistor (30) and a resistor (31) in series, to the same terminal of the capacitor (16) that the outputs of the other SD's are ultimately connected to at (17). The low pass filter and adder consists of the SD's (5), (6), (7), (8), (26) and (27), the resistors (13), (14), (15), (30) and (31) and the capacitor (16). The relative proportions of the signals added can be altered through adjustment of the variable resistors (14) and (30). The generator (19) produces a square voltage waveform (32) which is similar to the waveform in FIGS. 2A–2F. A received waveform (33) is generally similar to the depiction of a received waveform (21) in FIG. 2B. The signal at the gate (9) is shown by the waveform (34);

the signal at the gate (10) is shown by the waveform (37);

the signal at the gate (11) is shown by the waveform (38);

the signal at the gate (12) is shown by the waveform (35);

the signal at the gate (28) is shown by the waveform (36); and the signal at the gate (29) is shown by the waveform (39).

The delays between transmitter waveform transitions and the start of the first sampling period of each transmitter pulse are of equal duration;

the high pulse in waveform (34) and its counterpart in waveform (37) are of equal duration;

the high pulse in waveform (35) and its counterpart in waveform (38) are of equal duration; and the high pulse in waveform (37) and its counterpart in waveform (39) are of equal duration; these equalities allow the cancellation of asynchronous signals as per equation (3) since the signal for one sample in each pair is inverted by the inverter (4) before being added at (17). The delay between transmitter waveform transitions and any sampling of the received signal cancels the signal due to eddy currents produced in the conductive ground, just as in the first embodiment.

The first half of the transmitter voltage waveform (32) is of positive polarity, while its counterpart in the second half of the transmitter cycle is of negative polarity. This antisymmetry in the transmitter waveform produces antisymmetries about the same moments in the interrogating magnetic field and the received synchronous signals, both ground signals and those from first order objects. To avoid the complete cancellation of all signals, including those from metallic target objects, the signals sampled during the three sampling periods, while the transmitter polarity is positive, are of opposite sense with respect to the signals sampled during their respective counterpart sampling periods while the transmitter polarity is negative. In this embodiment there are three independent sampling periods, allowing for the independent cancellation of both the instantaneous and historical ground signals. Adjustment of the variable resistors (14) and (30) is the electronic equivalent of adjusting the coefficients of the linear combination in equation (2). As the nulls in both components of the ferrite ground signal are independent of one another, changes in the ratio of historical component to instantaneous component of the ground signal which might occur as the detector is moved over different examples of ground do not affect the ground balance in the way it affects that of a device of the first embodiment.

One problem with the invention in this embodiment is that some metallic target objects will have a characteristic frequency such that the received signal induced by the decay of eddy currents within them is nulled along with the ferrite ground signal. Perfect cancellation is not necessary in order to obscure the signal of this particular range of first order objects; a signal produced by an imperfect cancellation of the target signal have a magnitude is small enough to be counted as a null signal for the tolerances set within the device to allow for non-linearities inherent within any electronic system.

THE THIRD PREFERRED EMBODIMENT

The problem of the obscured range of target objects is addressed in a third embodiment of the invention. This description of the third preferred embodiment refers to FIGS. 5A to 9 in detail.

In the third embodiment there is cancellation of the instantaneous and historical components of the ground signal due to ferrite as well as cancellation of the signal due to conductive ground. Cancellation of asynchronous signals is also effected in accordance with the method implied by equation (3). FIGS. 5A–8F show possible voltage waveforms applied to various points in the invention. As is shown by waveform (40) of FIGS. 5A–8F, there are two different periods of square wave voltage oscillation applied to the transmitter coil. In FIGS. 5A–8F the intervals Q1 to Q2 (interval A), Q2 to Q3 (interval B), Q3 to Q4 (interval C) and Q4 to Q1 (interval D) together in a sequence constitute one transmission cycle; the intervals are of equal duration. Before a detailed explanation of the method and operation of the third preferred embodiment is given, a description of how the two different periods of oscillation of the transmitter voltage waveform affect the magnetic fields of the target volume and the signals that changes in these fields induce in the receiver coil shall be given.

Each transition in the voltage waveform applied to the transmitter coil produces a sudden change of sign in the rate of change in the intensity of the interrogating magnetic field, which in turn induces a sudden change in sign of eddy currents induced by the interrogating field within first order objects. The received signals induced by eddy currents in first order objects of high characteristic frequency are accentuated, at the expense of signals induced by eddy currents in first order objects of low characteristic frequency, after transmitter voltage transitions following transmitted pulses of short duration. The received signals induced by eddy currents in first order objects of low characteristic frequency are accentuated, at the expense of signals induced by eddy currents in first order objects of high characteristic frequency, after transmitter voltage transitions following transmitted pulses of long durations which are at least four times the durations of the said pulses. The received signals induced by the eddy currents in first order objects of both high and low characteristic frequencies are large soon after a transition in transmitter voltage signal which follows a transmitted pulse of long duration, the signals induced by the eddy currents in first order objects being particularly accentuated. After a transmitter voltage transition, each instance of eddy current will decay substantially exponentially until it attains a slowly changing current which is maintained by the nearly constant change in the intensity of the interrogating field. The time constant of the exponential decay of an eddy current after a period of transition is determined substantially by the physical properties, that is the resistance R and induction L, of the first order object in which the eddy current exists; it is substantially independent of the nature of the transition which influences only the magnitude of the eddy current. This description applies equally to the continuum of first order objects which is taken to represent the mild conductivity of ground.

Unlike that of an eddy current in a first order object, a signal induced in the receiver coil by changes in the historical component of the field due to ferrites in the target volume (c.f. equation (6)) is not exponential in its decay, depends upon the nature of the interrogating field prior to any particular moment and is independent, except for its amplitude, of the physical properties of the ferrites involved. In principle, when producing a linear combination of demodulated samples of the received signal in order to produce a null for the historical component of the ferrite ground signal (c.f. equation (8)) produced with a sequence of transmitted pulses with a fixed period of repetition, it is possible that the received signals due to some first order metallic target objects with characteristic frequencies of or near a particular value will also be nulled or nearly nulled at the same time. This is an undesirable trait when signals of all characteristic frequencies are to be considered. Lengthening the period of repetition of the series of pulses, that is lengthening the duration for which the interrogating field is continuously applied with each particular orientation, produces a change in the historical signal, as described previously without changing the first order object signal except for a multiplicative constant. In this instance, with a large enough difference in the periods in repetition of the two sequences of pulses, a linear combination of averaged samples of the received signal designed to null the historical signal component will not null the first order signal. A factor of more than four in the repetition periods will produce easily discernible first order signal in at least one of the linear combinations which null the historical signal component for a large, continuous range of characteristic first order object frequencies.

The third preferred embodiment is produced after the principles outlined above. The waveform (40) of FIGS. 5A–8F shows the transmitter voltage oscillations of the intervals B and D as having a period 8 times that of the transmitter oscillations in the periods A and C. The transmission cycle is repeated continuously during operation of the invention.

Figure 9:
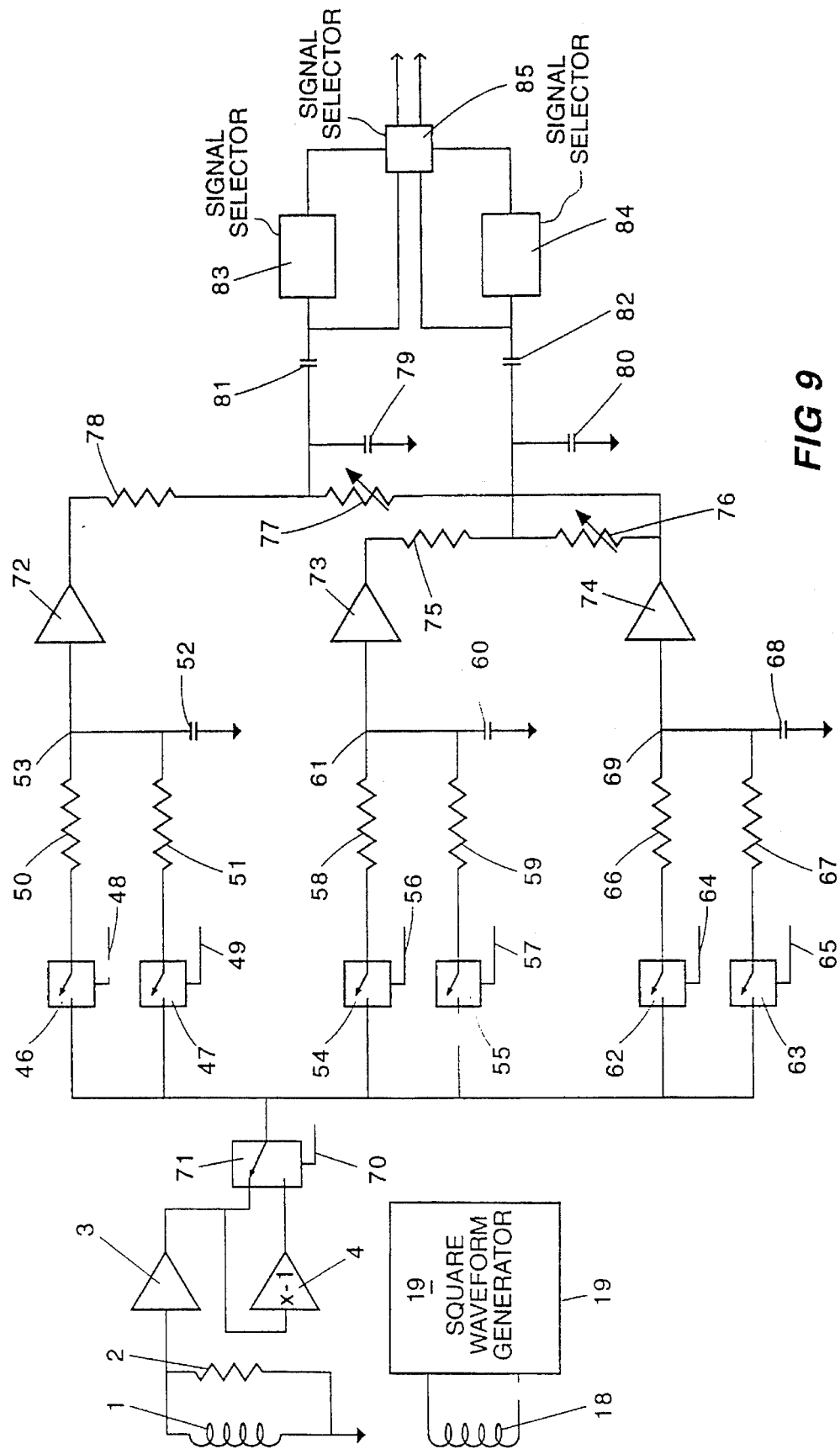
FIG. 9 shows a basic electronic block diagram of the third preferred embodiment.

A device for implementing the third preferred embodiment is shown in FIG. 9. The components labelled (1), (2), (3), (4), (18) and (19) perform the same functions as the similarly labelled components in FIG. 1 and FIG. 3. The output of the preamplifier (3) and the output of the inverting amplifier (4) are connected to a switch (71) which connects one or the other to its output, depending on the state of the synchronous signal applied to its gate (70). The signal applied to the gate (70) is depicted by the waveform (45) in FIGS. 5A–8F; a high voltage in (45) indicates that the output of (71) is of positive switch phase while a low voltage in (45) indicates that the output of (71) is of negative switch phase.

The output of (71) is connected to the inputs of 6 synchronous demodulators (46), (47), (54), (55), (62) and (63), whose states are controlled by the signals applied to their respective gates (48), (49), (56), (57), (64) and (65). As with the demodulators in the first two embodiments, when a low signal is applied to the gate of any of the demodulators, its output presents a very high impedance; when a high signal is applied to the gate, the output of the demodulator is set to the same voltage as its input and the output presents a low output impedance. For any of the seven switches, a period of high gate signal indicates that the demodulator or switch is on and a period for which a switch is on shall be called its sampling period.

The six demodulators are grouped in 3 pairs. The first pair is of demodulators (46) and (47); the output of (46) is connected to the grounded capacitor (52) at the output (53) through the resistor (50) while the output of (47) is connected to the capacitor (52) at the output (53) through the resistor (51). The second pair of demodulators is of the demodulators (54) and (55); the output of (54) is connected to the grounded capacitor (60) at the output (61) through the resistor (58) while the output of (55) is connected to the capacitor (60) at the output (61) through the resistor (59). The third pair of demodulators is of the demodulators (62) and (63); the output of (62) is connected to the grounded capacitor (68) at the output (69) through the resistor (66) while the output of (63) is connected to the capacitor (68) at the output (69) through the resistor (67). Each combination of two resistors and a grounded capacitor produces a low pass filter which serves to average the signals coming through its respective pair of demodulators.

Each demodulator is turned on only after enough time has elapsed since the immediately previous voltage transition in the transmission signal such that the signal due to eddy currents in the conductive ground has substantially decayed to zero. In the first pair of demodulators, their gates (48) and (49) are controlled by voltage signals depicted by waveforms (41) and (43) respectively. The sampling periods of the demodulator (46) all occur during intervals A and C, during the first half of each transmitter pulse. That the demodulator is on during periods of positive switch phase in the interval A, it is on during periods of negative switch phase in the interval C for equal total periods in the intervals and that the sense of the transmitted magnetic field does not affect the sense of the asynchronous signals ensures the cancellation of asynchronous signals as per equation (3) at the output (53); the equivalent arrangement produces the same result for the sampling periods of the demodulator (47). The sense of a synchronous signal is dependent upon the sense of the transmitted field; the sense of the instantaneous component of the ferrite ground signal depends upon whether the transmitted field is increasing or decreasing in intensity.

The switch phase of (71) and the senses of the transmitter voltage pulses are combined such that the sense of the total signal from one of the demodulators of each pair of demodulators is opposite to that of the sense of the total signal of the other demodulator of the pair; the combination of the two signals of any pair of demodulators corresponds to the subtraction of a multiple of one signal from a multiple of the other. This applies to all such demodulator pairs. The values of the resistors (50) and (51) are adjusted so that the signal samples are combined in a manner which produces a null in the instantaneous component of the ferrite ground signal at the output of the low pass filter (53). Note that because the sampling periods indicated by waveform (43) occur at a time which is several times the pulse width of the last pulse of opposite polarity to be transmitted, the signals due to changing eddy currents in first order target objects and signals due to the decay of the remanent magnetic field in ferrites will both have decayed to substantially zero at that time of sampling, so cancellation of the instantaneous component of the ferrite ground signal in this manner leaves the sensitivity of the invention to first order objects and the historical component of the ferrite ground signal unaffected.

A second time averaged signal is formed at the output (61). The signal samples are timed with signals applied as per the voltage waveforms (45), (44) and (43) to the gates of the elements (71), (54) and (55) respectively. All samples are taken during intervals B and D. Asynchronous signals from both demodulator channels are cancelled independently by subtracting samples of equal duration but opposite sense from each other at the time averaged output (61). The values of the resistors (58) and (59) are chosen to effect a substantial cancellation of the instantaneous component of the ferrite ground signal at the time averaged output (61). A third time averaged signal is formed at the output (69). The signal samples are timed with signals applied as per the voltage waveforms (45), (42) and (43) to the gates of the elements (71), (62) and (63) respectively, with the samples taken during intervals B and D. Asynchronous signals from both demodulator channels are cancelled independently by subtracting samples of equal duration but opposite sense from each other at the time averaged output (69). The values of the resistors (66) and (67) are chosen to effect a substantial cancellation of the instantaneous component of the ferrite ground signal at the time averaged output (69).

It is possible to form other combinations of the sampling periods as depicted in FIGS. 5A–8F such that the time averaged output signal is substantially nulled to the instantaneous component of the ferrite ground signal with outputs which contain more or less signal due to the historical component than those combinations presented here; however, only three linearly independent combinations are possible in this embodiment. Linear combinations of pairs of the signals at the outputs (53), (61) and (69) can be formed which produce signals in which the historical component has been substantially cancelled, thus finally effecting substantial cancellation of asynchronous signals, ground conduction signals and the historical and instantaneous components of the ferrite ground signals.

Two linearly independent signals can be produced with linear combinations of the three signals at the outputs (53), (61) and (69). Each of these signals will have a null and associated minimum in response to first order objects with characteristic frequencies of or near a certain value. The coefficients of the two linear combinations of the signals at the outputs (53), (61) and (69) can be selected such that the difference between the two characteristic frequencies central to the minima is large enough that each such signal is near a maximum in response at the same characteristic frequency is near a null in response. The two so produced signals can be high pass filtered to remove constant signals, then a means of selection employed such that the stronger of the two signals is passed to the indicator means. To this end, each signal at (53), (61) and (69) is sent to a separate buffer (72), (73) and (74) respectively. Two linear combinations of the three signals are formed. The first said linear combination is formed by sending the output from (72) through the resistor (78) to the grounded capacitor (79) and the output of (74) through the variable resistor (77) to the grounded capacitor (79). The second linear combination is formed by sending the output of (73) through the resistor (75) to the grounded capacitor (80) and sending the output of (74)

though the variable resistor (76) to the grounded capacitor (80). Both of the thus formed signals are sent though high pass filters (81) and (82) to a means of selecting (83, 84, 86) the signal of greatest magnitude to be further sent via processing means to an indicator means.

The indicator means can be an audible signal, a visual signal or any other means to give an operator an indication of metallic target objects within the target volume. In addition, the magnitude of the indicating signal can be adapted to indicate the extent of the metal target object.

For simplicity, the outputs (53), (61) and (69) need not be formed explicitly before subtraction of one from another to yield a final universally ground balanced signal; the cancellation of the ferrite signals can be formed directly by passing at least three appropriate synchronous demodulator signals to a low pass filter in a suitable linear combination.

If the demodulation periods are set to be very short, electronic noise might become significant. Thus a useful compromise is to select a received signal sample duration between an eighth and a quarter of period of the transmit oscillation. Furthermore, the clearest indication of whether an object is ferrous or not is manifest at the end of transmitted pulses of long duration which follow short transmitted pulses during which current in the transmitter coil is relatively low. In the third preferred embodiment ferrous discrimination could be achieved by comparing the sign of the signal sampled according to waveform (43) during which the signal is substantially only due to the instantaneous component of the ground signal to the signal of one of the outputs (53) or (61) where the instantaneous ground signal has been substantially cancelled.

As the transmitter and receiver coils are moved over different soils, their inductances are modulated by the varying permeability of the soils. This changes the quality factor (Q) of the coils which in turn varies the current flowing through the transmitter coil. This variation is most significant at the end of long transmitted pulses or when the transmitter coil current is relatively large. Changes in Q must be compensated for or else the effective gain of the coil will be modulated as the inductance is modulated by the varying permeability. One of the simplest way of doing this is to measure the current flowing through the transmitter coil and compensate for its changes. The current can be measured by monitoring a voltage across a small valued resistance or inductance, which can be a current transformer, in series with the transmitter coil which either decreases or increases with increasing Q depending as to where in the transmission cycle the current is measured. Another way is to have a second receiver coil well magnetically coupled to the transmitter coil. The emf across this coil then indicates the Q which increases with increasing Q. The monitored transmitter coil signal can then be used to multiply appropriate receive signals so as to effectively cancel the effects of changing Q.

It should be noted that in all the above embodiments, it is never possible to cancel either component of the ferrite ground signal completely as at this time no electronics is perfectly linear and all electronics drifts with time. Thus, cancelled signal components can become non-zero. It is necessary to compensate for these drifts by adjusting the gain of at least one component of the input signal passed to the low pass filters, which can be achieved by adjusting resistor values described above at the low pass filter stage or adding a selected varied amount of the signal at the output (69) to a signal which has had all ground signals substantially cancelled; this can be done automatically with a separate circuit means.

It should also be noted that in all of the embodiments above, as long as only small voltages appear between the transmitter generator power supply rails and the transmitter coil when current is flowing into or out of the said power supply rail and the net averaged transmitted magnetic flux is zero, the power consumption will be relatively small and will depend on $\Omega$ and the transmitted pulse lengths. The reason for this is well established in numerous electronic applications such as switch mode power supplies. However, unipolar flux pulses can be transmitted under the condition that only small voltages appear between the transmit generator power supply rails and the transmitter coil when current is flowing into or out of the said power supply rail, if in addition a switch mode power supply is used to return net current dumped by the transmit coil to one power supply reservoir of the source power supply.

I claim:

1. A conducting metal discriminating detection apparatus for detecting a metal target in a target region comprising:

transmission means for transmitting a continuous pulsed voltage waveform to provide an alternating magnetic flux in the target region, the continuous pulsed voltage waveform comprising abrupt transitions from one substantially non-zero steady state voltage to at least one other substantially non-zero steady state voltage, the period between any two consecutive abrupt transitions being termed a pulse period, the said continuous pulsed voltage waveform comprising pulse periods of two different durations, they being a short duration and a long duration, the long duration being at least four times the duration of the short duration;

a detector coil for detecting a rate of change of magnetic flux in the target region, the rate of change of magnetic flux being a function of the alternating magnetic flux in the target region and the detector coil providing an induced voltage output signal in response to the rate of change of magnetic flux;

measurement means for measuring and providing at least three measurements of the induced voltage output signal over a selected period of time at spaced apart times, each measurement period starting after a duration of an initial time interval where the initial time interval starts directly after one of the abrupt transitions and finishes when the rate of change of eddy currents produced by the effects of the alternating magnetic flux upon conductive soils within the target region is substantially zero, and each measurement period begins with the first measurement period occurring during the first half of at least one pulse period of short duration to measure a first measurement, the second measurement period occurring within the last quarter of a pulse period of long duration which immediately follows an abrupt transition which ends a pulse period of short duration to measure a second measurement, the third measurement period occurring during a pulse period of long duration which directly follows an abrupt transition which ends a previous pulse period of long duration to measure a third measurement, processing and averaging means adapted to process and average the at least three measurements of the induced voltage output signal to produce a ground balanced signal by nullifying from the at least three measurements contributions of two known functions, one function resulting from an instantaneous component and the other function resulting from a historical component of the effect of the alternating magnetic flux upon magnetic soils with the target regions, by scaling and subtracting two of the measurements from the remaining measurement and averaging them over the selected period of time; and assessing and indication means to provide an assessment of the ground balanced signal and to indicate, to an operator, the presence of a target object within the target region on the basis of the assessment.

2. A conducting metal discriminating detection apparatus as in claim 1, wherein;

the measurement means comprises synchronous demodulator means for synchronously demodulating the induced voltage output signal at the spaced apart times; and the processing and averaging means comprise electronic combiners and low pass filter means for combining and low pass filtering the synchronously demodulated induced voltage output signal at the spaced apart times.

3. A conducting metal discriminating detection apparatus as in claim 2, wherein:

there is a comparison means which produces a comparison signal by comparing the polarity of the second measurement, whose substantial component is the instantaneous component of the effect of the alternating magnetic flux upon magnetic soils within the target region to the polarity of the ground balanced signal; and the indication means is adapted to indicate the ferrous or non-ferrous nature of the target within the target region, the indication based upon the nature of the comparison signal.

4. A conducting metal discriminating detection apparatus as in claim 2, wherein the transmission means provides the continuous pulsed voltage waveform such that the received signal is maintained substantially independent of a reactive to resistive response ratio component of the magnetic soils within the target region which is frequency independent at frequencies below 100 kHz.

5. A conducting metal discriminating detection apparatus as in claim 2, wherein the synchronous demodulation means comprises n synchronous demodulators and is operably configurable to satisfy the equation:

$$\sum_{i=1}^{n} S_i P_i = 0,$$

where $S_i$ is the relative effective gain of the $i^{th}$ synchronous demodulator the output of which is to be added and low-pass filtered, where the sign of $S_i$ is consistent with the polarity of the pulse being demodulated, and $P_i$ is the relative period for which the respective synchronous demodulator is on.

6. A conducting metal discriminating detection apparatus as in claim 2, wherein the processing means is adapted such that the following equation is satisfied:

a. for an instantaneous component of the ground magnetic signal, $$\sum_{\alpha=1}^{I} G_k Mn\alpha_k \beta_k = 0$$

and b. for a historical component of the ground magnetic signal $$\sum_{\beta=1}^{I} G_k Cn\alpha_k \beta_k = 0$$

where $G_k$ is the gain of the demodulator passing the $k^{th}$ contribution, $Mn\alpha\beta$ is the demodulated and averaged instantaneous component, due to magnetic soils between the times $\alpha$ and $\beta$ following the $n^{th}$ transition from one substantially steady state voltage to at least one other substantially steady state voltage, and $Cn\alpha\beta$ is the demodulated and averaged historical component, due to magnetic soils, of the applied field between the times $\alpha$ and $\beta$ following the $n^{th}$ transition from one substantially steady state voltage to at least one other substantially steady state voltage.

7. A conducting metal discriminating detection apparatus for detecting a metal target in a target region comprising:

transmission means for transmitting a continuous pulsed voltage waveform to provide an alternating magnetic flux in the target region, the continuous pulsed voltage waveform comprising abrupt transitions from one substantially non-zero steady state voltage, the period between any two consecutive abrupt transitions being termed a pulse period, the said continuous pulsed voltage waveform comprising pulse periods of two different durations, they being a short duration and a long duration, the long duration being at least four times the duration of the short duration;

a detector coil for detecting a rate of change of magnetic flux in the target region, the rate of change of magnetic flux being a function of the alternating magnetic flux in the target region and the detector coil providing an induced voltage output signal in response to the rate of change of magnetic flux;

measurement means for measuring and providing at least four measurements of the induced voltage output signal over a selected period of time at spaced apart times, each measurement period starting after a duration of an initial time interval where the initial time interval starts directly after one of the abrupt transitions and finishes when the rate of change of eddy currents produced by the effects of the alternating magnetic flux upon conductive soils within the target region is substantially zero, and each measurement period ending before the next abrupt transition following the last abrupt transition before the measurement period began with the first measurement period occurring during the first half of at least one pulse period of short duration to measure a first measurement, the second measurement period occurring within the last quarter of a pulse period of long duration which immediately follows an abrupt transition which ends a pulse period of short duration to measure a second measurement, the third measurement period occurring during the first quarter of a pulse period of long duration which directly follows an abrupt transition which ends a previous pulse period of long duration to measure a third measurement and the fourth measurement period occurring during the same pulse period of long duration in which the third pulse period occurs but commencing only after the third measurement period has ended to produce a fourth measurement, processing means adapted to process the at least four measurements to the induced voltage signal to produce at least two ground balanced signals by nullifying from the at least four measurements when averaged over the selected period of time contributions to the at least four measurements of two known functions, one function resulting from an instantaneous component the other function resulting from a historical component of the effect of the alternating magnetic flux upon magnetic soils within the target region, the first ground balanced signal being sensitive to the presence of targets with low characteristic frequencies within the target region and the second ground balanced signal being sensitive to the presence of targets with characteristic frequencies higher than those of the targets with low characteristic frequencies within the target region;

a comparison means to compare the magnitude of the first ground balanced signal to the magnitude of the second ground balanced signal;

selection means to select one of the two ground balanced signals on the basis of their relative magnitudes; and indication means to indicate, to an operator, the presence of a target object within the target region, the indication means responding to whichever of the two ground balanced signals is selected by the selection means.

8. A conducting metal discriminating detection apparatus as in claim 7, wherein:

the measurement means comprises synchronous demodulator means for synchronously demodulating the induced voltage output signal at the spaced apart times; and the processing means comprises electronic adders and subtracters for combining and low pass filter means for low pass filtering and averaging the synchronously demodulated induced voltage output signal at the spaced apart times.

9. A conducting metal discriminating detection apparatus as in claim 8, wherein there is a further comparison means which produces a comparison signal by comparing the polarity of the second measurement whose substantial component is the instantaneous component of the effect of the alternating magnetic flux upon magnetic solid within the target region to the polarity of one of the ground balanced signals; and there is a further indication means which indicates the ferrous or non-ferrous nature of a target within the target region, the indication based upon nature of the second comparison signal.

10. A conducting metal discriminating detection apparatus as in claim 8, wherein the transmission means provides the continuous pulsed voltage waveform such that the received signal is maintained substantially independent of a reactive to resistive response ratio component of the magnetic soils within the target region which is frequency independent at frequencies below 100 kHz.

11. A conducting metal discriminating detection apparatus as in claim 8, wherein the synchronous demodulation means comprises n synchronous demodulators and is operably configurable to satisfy the equation:

$$\sum_{i=1}^{n} S_i P_i = 0,$$

where $S_i$ is the relative effective gain of the $i^{th}$ synchronous demodulator the output of which is to be added and low-pass filtered, where the sign of $S_i$ is consistent with the polarity of the pulse being demodulated, and $P_i$ is the relative period for which the respective synchronous demodulator is on.

12. A conducting metal discriminating detection apparatus as in claim 8, wherein the processing means is adapted such that the following equation is satisfied:

a. for an instantaneous component of the ground magnetic signal, $$\sum_{\alpha=1}^{I} G_k Mn\alpha_k \beta_k = 0$$

and b. for a historical component of the ground magnetic signal $$\sum_{\beta=1}^{I} G_k Cn\alpha_k \beta_k = 0$$

where $G_k$ is the gain of the demodulator passing the $k^{th}$ contribution,

Mn$\alpha\beta$ is the demodulated and averaged instantaneous component, due to magnetic soils between the times $\alpha$ and $\beta$ following the $n^{th}$ transition from one substantially steady state voltage to at least one other substantially steady state voltage, and Cn$\alpha\beta$ is the demodulated and averaged historical component, due to magnetic soils, of the applied field between the times $\alpha$ and $\beta$ following the $n^{th}$ transition from one substantially steady state voltage to at least one other substantially steady state voltage.

13. A method of conducting metal discriminating detection apparatus for detecting a metal target in a target region comprising:

transmitting a continuous pulsed voltage waveform to provide an alternating magnetic flux in the target region, the continuous pulsed voltage waveform comprising abrupt transitions from one substantially non-zero steady state voltage to at least one other substantially non-zero steady state voltage, the period between any two consecutive abrupt transitions being termed a pulse period, the said continuous pulsed voltage waveform comprising pulse periods of two different durations, they being a short duration and a long duration, the long duration being at least four times the duration of the short duration;

detecting the rate of change of magnetic flux in the target region, the rate of change of magnetic flux being a function of the alternating magnetic flux in the target region and the detector coil providing an induced voltage output signal in response to the rate of change of magnetic flux;

measuring at least three measurements of the induced voltage output signal over a selected period of time at spaced apart times, each measurement period starting after a duration of an initial time interval where the initial time interval starts directly after one of the abrupt transitions and finishes when the rate of change of eddy currents produced by the effects of the alternating magnetic flux upon conductive soils within the target region is substantially zero, and each measurement period begins with the first measurement period occurring during the first half of at least one pulse period of short duration to measure a first measurement, the second measurement period occurring within the last quarter of a pulse period of long duration which immediately follows an abrupt transition which ends a pulse period of short duration to measure a second measurement, the third measurement period occurring during a pulse period of long duration which directly follows an abrupt transition which ends a previous pulse period of long duration to measure a third measurement, processing and averaging the at least three measurements of the induced voltage output signal to produce a ground balanced signal by nullifying from the at least three measurements contributions of two known functions, one function resulting from an instantaneous component and the other function resulting from a historical component of the effect of the alternating magnetic flux upon magnetic soils with the target regions, by scaling and subtracting two of the measurements from the remaining measurement and averaging them over the selected period of time; and affecting an assessment of the ground balanced signal and to indicate to an operator the presence of a target object within the target region on the basis of the assessment.

14. A method of conducting metal discriminating detection as in claim 13, wherein the steps of detecting and measuring comprise the steps of:

synchronous demodulating the induced voltage output signal at the spaced apart times; and low pass filtering and averaging the synchronous demodulated induced voltage output signal at the spaced apart times.

15. A method of conducting metal detection as in claim 14 further characterised by the target region having a reactive to resistive response ration which is substantially independent of an interrogating frequency below 100 kHz.

16. A method of conducting metal discrimination as in claim 15 wherein the synchronous demodulation means comprises n synchronous demodulators and is operably configurable to satisfy the equation:

$$\sum_{i=1}^{n} S_i P_i = 0,$$

where $S_i$ is the relative effective gain of the $i^{th}$ synchronous demodulator the output of which is to be added and low-pass filtered, where the sign of $S_i$ is consistent with the polarity of the pulse being demodulated, and $P_i$ is the relative period for which the respective synchronous demodulator is on.

17. A method of conducting metal discrimination as in claim 15 wherein the processing means is adapted such that the following equation is satisfied;

a. for an instantaneous component of the ground magnetic signal, $$\sum_{\alpha=1}^{I} G_k M n \alpha_k \beta_k = 0$$

and b. for a historical component of the ground magnetic signal $$\sum_{\beta=1}^{I} G_k C n \alpha_k \beta_k = 0$$

where $G_k$ is the gain of the demodulator passing the $k^{th}$ contribution,

Mn$\alpha\beta$ is the demodulated and averaged instantaneous component, due to magnetic soils between the times $\alpha$ and $\beta$ following the $n^{th}$ transition from one substantially steady state voltage to at least one other substantially steady state voltage, and Cn$\alpha\beta$ is the demodulated and averaged historical component, due to magnetic soils, of the applied field between the times $\alpha$ and $\beta$ following the $n^{th}$ transition from one substantially steady state voltage to at least one other substantially steady state voltage.

18. A method of conducting metal discriminating detection of a metal target in a target region comprising the steps of:

transmitting a continuous pulsed voltage waveform to provide an alternating magnetic flux in the target region, the continuous pulsed voltage waveform comprising abrupt transitions from one substantially non-zero steady state voltage, the period between any two consecutive abrupt transitions being termed a pulse period, the said continuous pulsed voltage waveform comprising pulse periods of two different durations, they being a short duration and a long duration, the long duration being at least four times the duration of the short duration:

detecting the rate of change of magnetic flux in the target region, the rate of change of magnetic flux being a function of the alternating magnetic flux in the target region and the detector coil providing an induced voltage output signal in response to the rate of change of magnetic flux;

measuring at least four measurements of the induced voltage output signal over a selected period of time at spaced apart times, each measurement period starting after a duration of an initial time interval where the initial time interval starts directly after one of the abrupt transitions and finishes when the rate of change of eddy currents produced by the effects of the alternating magnetic flux upon conductive soils within the target region is substantially zero, and each measurement period ending before the next abrupt transition following the last abrupt transition before the measurement period began with the first measurement period occurring during the first half of at least one pulse period of short duration to measure a first measurement, the second measurement period occurring within the last quarter of a pulse period of long duration which immediately follows an abrupt transition which ends a pulse period of short duration to measure a second measurement, the third measurement period occurring during the first quarter of a pulse period of long duration which directly follows an abrupt transition which ends a previous pulse period of long duration to measure a third measurement and the fourth measurement period occurring during the same pulse period of long duration in which the third pulse period occurs but commencing only after the third measurement period has ended to produce a fourth measurement, processing the at least four measurements of the induced voltage signal to produce at least two ground balanced signals by nullifying from the at least four measurements when averaged over the selected period of time contributions to the at least four measurements of two known functions, one function resulting from an instantaneous component the other function resulting from a historical component of the effect of the alternating magnetic flux upon magnetic soils within the target region, the first ground balanced signal being sensitive to the presence of targets with low characteristic frequencies within the target region and the second ground balanced signal being sensitive to the presence of targets with characteristic frequencies higher than those of the targets with low characteristic frequencies within the target region;

comparing the magnitude of the first ground balanced signal to the magnitude of the second ground balanced signal;

selecting one of the two ground balanced signals on the basis of their relative magnitudes; and effecting an assessment signal to indicate, to an operator, the presence of a target object within the target region, the indication responding to whichever of the two ground balanced signals is selected.

19. A method of conducting metal discriminating detection as in claim 18, wherein the steps of detecting and measuring comprise the steps of:

synchronous demodulating the induced voltage output signal at the spaced apart times; and low pass filtering and averaging the synchronous demodulated induced voltage output signal at the spaced apart times.

20. A method of conducting metal detection as in claim 19, further characterised by the target region having a reactive to resistive response ration which is substantially independent of an interrogating frequency below 100 KHz.

21. A method of conducting metal discrimination as in claim 20 wherein the synchronous demodulation means comprises n synchronous demodulators and is operably configurable to satisfy the equation:

$$\sum_{i=1}^{n} S_i P_i = 0,$$

where $S_i$ is the relative effective gain of the $i^{th}$ synchronous demodulator the output of which is to be added and low-pass filtered, where the sign of $S_i$ is consistent with the polarity of the pulse being demodulated, and $P_i$ is the relative period for which the respective synchronous demodulator is on.

22. A method of conducting metal discrimination as in claim 20, wherein the processing means is adapted such that the following equation is satisfied:

a. for an instantaneous component of the ground magnetic signal, $$\sum_{\alpha=1}^{I} G_k Mn\alpha_k\beta_k = 0$$

and b. for a historical component of the ground magnetic signal $$\sum_{\beta=1}^{I} G_k Cn\alpha_k\beta_k = 0$$

where $G_k$ is the gain of the demodulator passing the $k^{th}$ contribution, $Mn\alpha\beta$ is the demodulated and averaged instantaneous component, due to magnetic soils between the times $\alpha 0$ and $\beta$ following the $n^{th}$ transition from one substantially steady state voltage to at least one other substantially steady state voltage, and $Cn\alpha\beta$ is the demodulated and averaged historical component, due to magnetic soils, of the applied field between the times $\alpha$ and $\beta$ following the $n^{th}$ transition from one substantially steady state voltage to at least one other substantially steady state voltage.

* * * * *